United States Patent [19]
Tomizawa et al.

[11] Patent Number: 5,877,781
[45] Date of Patent: Mar. 2, 1999

[54] MEMORY CONTROL DEVICE FOR VIDEO EDITOR

[75] Inventors: Mizou Tomizawa; Atsushi Tomita; Hironori Mikami; Satoshi Seto, all of Osaka, Japan

[73] Assignee: Roland Kabushiki Kaisha, Osaka, Japan

[21] Appl. No.: 593,257

[22] Filed: Jan. 29, 1996

[51] Int. Cl.$^6$ .................................................. G06F 13/16
[52] U.S. Cl. ........................ 345/521; 345/507; 345/328; 348/589; 386/52
[58] Field of Search .................................. 345/326–328, 345/521, 507, 508, 203; 348/575, 576, 584–590, 593–596, 722; 386/52, 64, 83, 91

[56] References Cited

U.S. PATENT DOCUMENTS

| | | | |
|---|---|---|---|
| 5,051,845 | 9/1991 | Gardner et al. | 386/52 |
| 5,282,038 | 1/1994 | Lowe | 348/659 |
| 5,384,912 | 1/1995 | Ogrinc et al. | 345/523 |
| 5,412,479 | 5/1995 | Alig et al. | 348/594 |
| 5,535,137 | 7/1996 | Rossmere et al. | 358/537 |
| 5,539,527 | 7/1996 | Kajimoto et al. | 386/52 |
| 5,621,428 | 4/1997 | King et al. | 345/118 |
| 5,621,536 | 4/1997 | Kizu | 386/52 |

*Primary Examiner*—Matthew M. Kim
*Assistant Examiner*—U. Chauhan
*Attorney, Agent, or Firm*—Lyon & Lyon LLP

[57] ABSTRACT

For the sake of elevating significantly user's flexibility in edits of video signals, the memory control device for video editors comprises a storage means for storing at least one or more of title data composed of video image data representing title signals and key data used for controlling the title signal; a first memory for storing video image data and which is provided with a data reading means for reading the video image data so as to be capable of displaying the data in the form of a video image; a second memory for storing a key data and which is provided with a video image controlling means for controlling a video image to be displayed on the basis of the key data read; a specifying means for specifying a memory into which is to be written the title data; and a writing means which reads the video image data and the key data of title data to write both the data read into the first memory and the second memory, respectively, in the case when the first memory is specified by the specifying means, while which reads only the key data of the title data to write the data read into the second memory in the case when the second memory is specified by the specifying means.

3 Claims, 22 Drawing Sheets

| CASE | SELECTING CONDITION | | DECIDED RESULTS | APPLICATION PURPOSE |
|---|---|---|---|---|
| | TYPE OF READOUT FILE | SPECIFICATION OF WRITING MEMORY | DECIDED WRITING MEMORY AND FILE TO BE WRITTEN | |
| 1 | TITLE FILE [FRAME DATA] [ALPHA DATA] | FRAME MEMORY | FRAME MEMORY [FRAME DATA] ALPHA MEMORY [ALPHA DATA] | TITLE SIGNAL– ANALOG KEY |
| 2 | TITLE FILE [FRAME DATA] [ALPHA DATA] | ALPHA MEMORY | FRAME MEMORY [—] ALPHA MEMORY [ALPHA DATA] | TITLE SIGNAL USING NO FRAME MEMORY–ANALOG KEY |
| 3 | IMAGE FILE [FRAME DATA] | FRAME MEMORY | FRAME MEMORY [FRAME DATA] ALPHA MEMORY [—] | IMAGE FILE SIGNAL |
| 4 | IMAGE FILE [FRAME DATA] | ALPHA MEMORY | FRAME MEMORY [—] ALPHA MEMORY [ALPHA DATA] GRAY-SCALED | DIVERSION OF IMAGE FILE INTO ALPHA FILE WIPE EFFECT–DIGITAL KEY TRANSMITTING EFFECT–ANALOG KEY LUMINANCE KEY EFFECT USING IMAGE FILE |
| 5 | ALPHA FILE [ALPHA DATA] | FRAME MEMORY | FRAME MEMORY [ALPHA DATA INTO WHITE/BLACK DATA] ALPHA MEMORY [—] | DIVERSION OF ALPHA FILE INTO IMAGE FILE WHITE/BLACK IMAGE FILE SIGNAL NO WRITING OF FILE |
| 6 | ALPHA FILE [ALPHA DATA] | ALPHA MEMORY | FRAME MEMORY [—] ALPHA MEMORY [ALPHA DATA] | WIPE EFFECT–DIGITAL KEY TRANSMITTING EFFECT–ANALOG KEY |

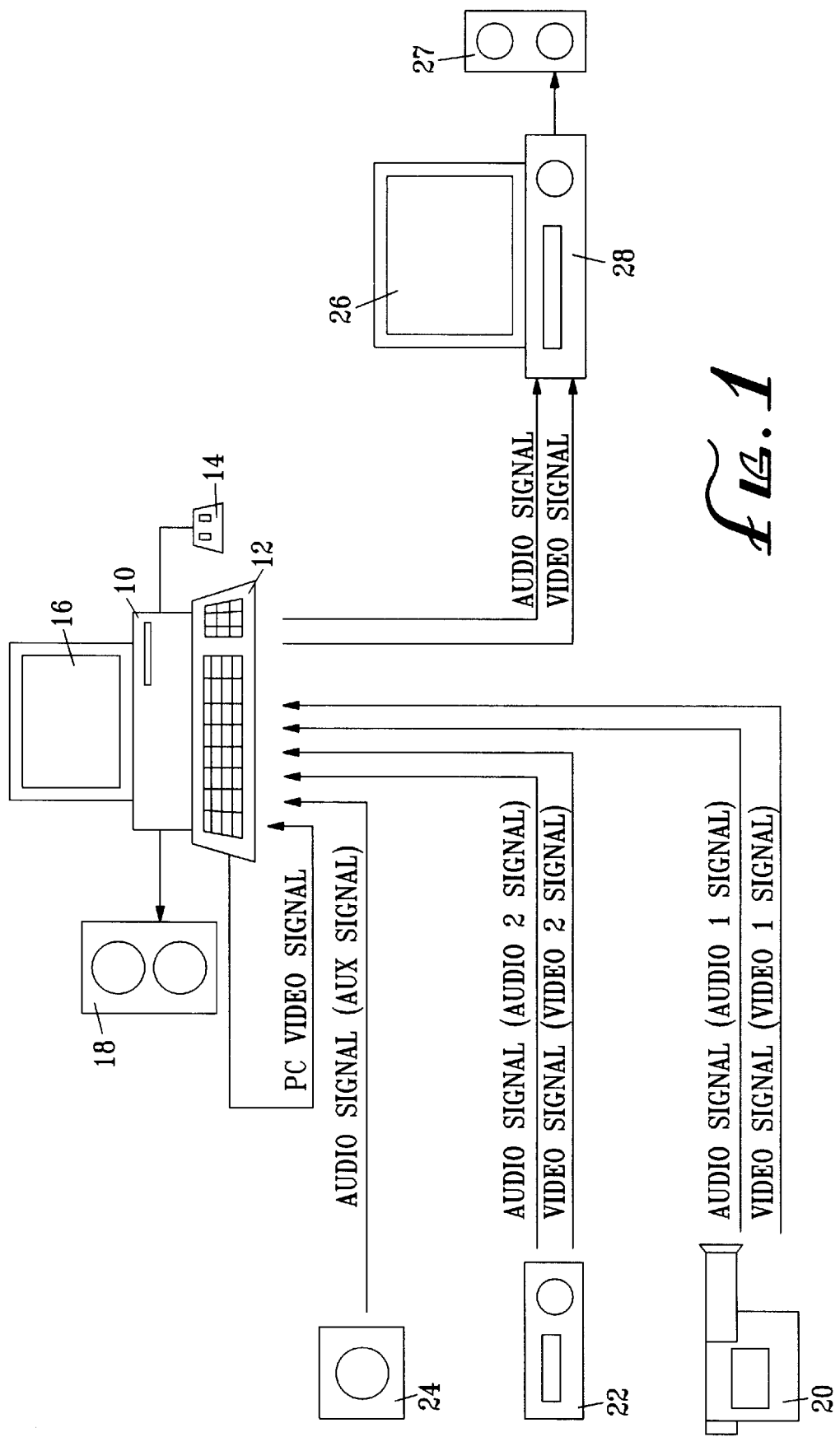

Fig. 7

| CASE | SELECTING CONDITION | | DECIDED RESULTS | APPLICATION PURPOSE |
|---|---|---|---|---|
| | TYPE OF READOUT FILE | SPECIFICATION OF WRITING MEMORY | DECIDED WRITING MEMORY AND FILE TO BE WRITTEN | |
| 1 | TITLE FILE { FRAME DATA, ALPHA DATA } | FRAME MEMORY | FRAME MEMORY ALPHA MEMORY { FRAME DATA, ALPHA DATA } | TITLE SIGNAL—ANALOG KEY |
| 2 | TITLE FILE { FRAME DATA, ALPHA DATA } | ALPHA MEMORY | FRAME MEMORY ALPHA MEMORY { —, ALPHA DATA } | TITLE SIGNAL USING NO FRAME MEMORY—ANALOG KEY |
| 3 | IMAGE FILE { FRAME DATA } | FRAME MEMORY | FRAME MEMORY ALPHA MEMORY { FRAME DATA, — } | IMAGE FILE SIGNAL |
| 4 | IMAGE FILE { FRAME DATA } | ALPHA MEMORY | FRAME MEMORY ALPHA MEMORY { —, ALPHA DATA } GRAY-SCALED | DIVERSION OF IMAGE FILE INTO ALPHA FILE WIPE EFFECT—DIGITAL KEY TRANSMITTING EFFECT—ANALOG KEY LUMINANCE KEY EFFECT USING IMAGE FILE |
| 5 | ALPHA FILE { ALPHA DATA } | FRAME MEMORY | FRAME MEMORY ALPHA MEMORY { ALPHA DATA, — } INTO WHITE/BLACK DATA | DIVERSION OF ALPHA FILE INTO IMAGE FILE WHITE/BLACK IMAGE FILE SIGNAL / NO WRITING OF FILE |
| 6 | ALPHA FILE { ALPHA DATA } | ALPHA MEMORY | FRAME MEMORY ALPHA MEMORY { —, ALPHA DATA } | WIPE EFFECT—DIGITAL KEY TRANSMITTING EFFECT—ANALOG KEY |

ALPHA DATA

DIGITAL KEY MODE

ANALOG KEY MODE

| INTERNAL SWITCH<br>SIGNAL | SW1 | SW2 | SW3 | SW4 | SW5 | SW6 |
|---|---|---|---|---|---|---|
| VIDEO 1' SIGNAL | A | A | A | A | A | A |
| VIDEO 2 SIGNAL (TBC) | B | A | A | B | A | A |
| VIDEO 2 SIGNAL (FRAME SYNCHRONIZER) | B | A | A | A | A | A |
| PC VIDEO SIGNAL (SCAN CONVERTER) | — | B | B | A OR B | A | A |
| IMAGE FILE SIGNAL (FRAME BUFFER) | — | — | — | A OR B | B | A |
| CAPTURING PROCESSING | A OR B | A | A | — | A | B |

— ••• DOES NOT FUNCTION AS INTERNAL SWITCH

*Fig. 9*

|  | STILL | STROBE | SCROLL | SOLARIZATION |
|---|---|---|---|---|
| STILL | — | × | ○ | × |
| STROBE | × | — | ○ | ○ |
| SCROLL | ○ | ○ | — | × |
| SOLARIZATION | × | ○ | × | — |

Fig. 20

MEMORY CONTROL DEVICE FOR VIDEO EDITOR

BACKGROUND OF THE INVENTION

1. Field of the Invention

The present invention relates to a memory control device for video editors, and more particularly to a memory control device in video editors used suitably for performing video edits by employing a personal computer and the like.

2. Description of the Related Art

As is observed in use of CD-ROMs, and in development of multimedia etc., a personal computer could have controlled freely audio and video signals recently. With such development in personal computers, a video editor in which audio and video signals can be freely controlled by the use of a personal computer has been proposed in recent years, and is called desk top video (DTV).

OBJECT AND SUMMARY OF THE INVENTION

It is an object of the present invention to provide a memory control device by which user's flexibility in edits of video signals is remarkably improved in the above described video editor.

In order to attain the above described object, the memory control device for video editors according to the present invention comprises a storage means for storing at least one or more of title data composed of video image data representing title signals and key data used for controlling the title signal; a first memory for storing video image data and which is provided with a data reading means for reading the video image data so as to be capable of displaying said data in the form of a video image; a second memory for storing key data and which is provided with a video image controlling means for controlling a video image to be displayed on the basis of the key data read; a specifying means for specifying a memory into which is to be written the title data which have been stored in said storage means; and a writing means which reads the video image data and the key data of title data from said storage means to write both the data thus read into said first memory and said second memory, respectively, in the case when said first memory is specified by said specifying means, while which reads only the key data of the title data from said storage means to write the data thus read into said second memory in the case when said second memory is specified by said specifying means.

Furthermore, according to another aspect of the present invention, the memory control device for video editors comprises a memory for storing key data used for controlling video images to be displayed and which is provided with a video image controlling means for controlling the video images on the basis of the key data read; a storage means for storing at least one or more of either of video image data or key data; an extracting means for extracting selectively data from said storage means; and a writing means for writing the key data extracted selectively by said extracting means into said memory with no conversion of the key data thus extracted in the case where the data extracted selectively by said extracting means are the key data, while writing the video image data extracted selectively by said extracting means into said memory with conversion of the video image data thus extracted selectively by said extracting means in the case where the data extracted selectively by said extracting means are the video image data.

Moreover, according to still another aspect of the present invention, the memory control device for video editors comprises a memory for storing video image data and which is provided with a data reading means for reading the video image data so as to be capable of displaying said data in the form of a video image; a storage means for storing at least one or more of either of the video image data or key data used for controlling a video image to be displayed; and a writing means for writing the video image data extracted selectively by said extracting means into said memory with no conversion of the video image data thus extracted in the case where the data extracted selectively by said extracting means are the video image data, while writing the key data extracted selectively by said extracting means into said memory with conversion of the key data thus extracted selectively by said extracting means in the case where the data extracted selectively by said extracting means are the key data.

BRIEF DESCRIPTION OF THE DRAWINGS

FIG. 1 is a conceptual diagram showing an example of the systematic constitution of a DTV employing a video editor provided with the memory control device according to the present invention.

FIG. 7 is a diagram illustrating specification of a reading file and a writing memory as well as a relationship between the writing memory specified by the above described specification and a written file.

FIGS. 8(a), 8(b) and 8(c) are explanatory views for reading data from an alpha memory wherein FIG. 8(a) shows alpha data;

FIG. 8(b) is an explanatory view for reading data from the alpha memory in a digital key mode; and FIG. 8(c) is an explanatory view for reading data from the alpha memory in an analog key mode FIG. 9 is a table showing a switched state in each of internal switches.

FIG. 20 is a diagram showing a proper or improper application in the combination of special effects.

DETAILED DESCRIPTION OF THE PREFERRED EMBODIMENTS

Figure 2A:
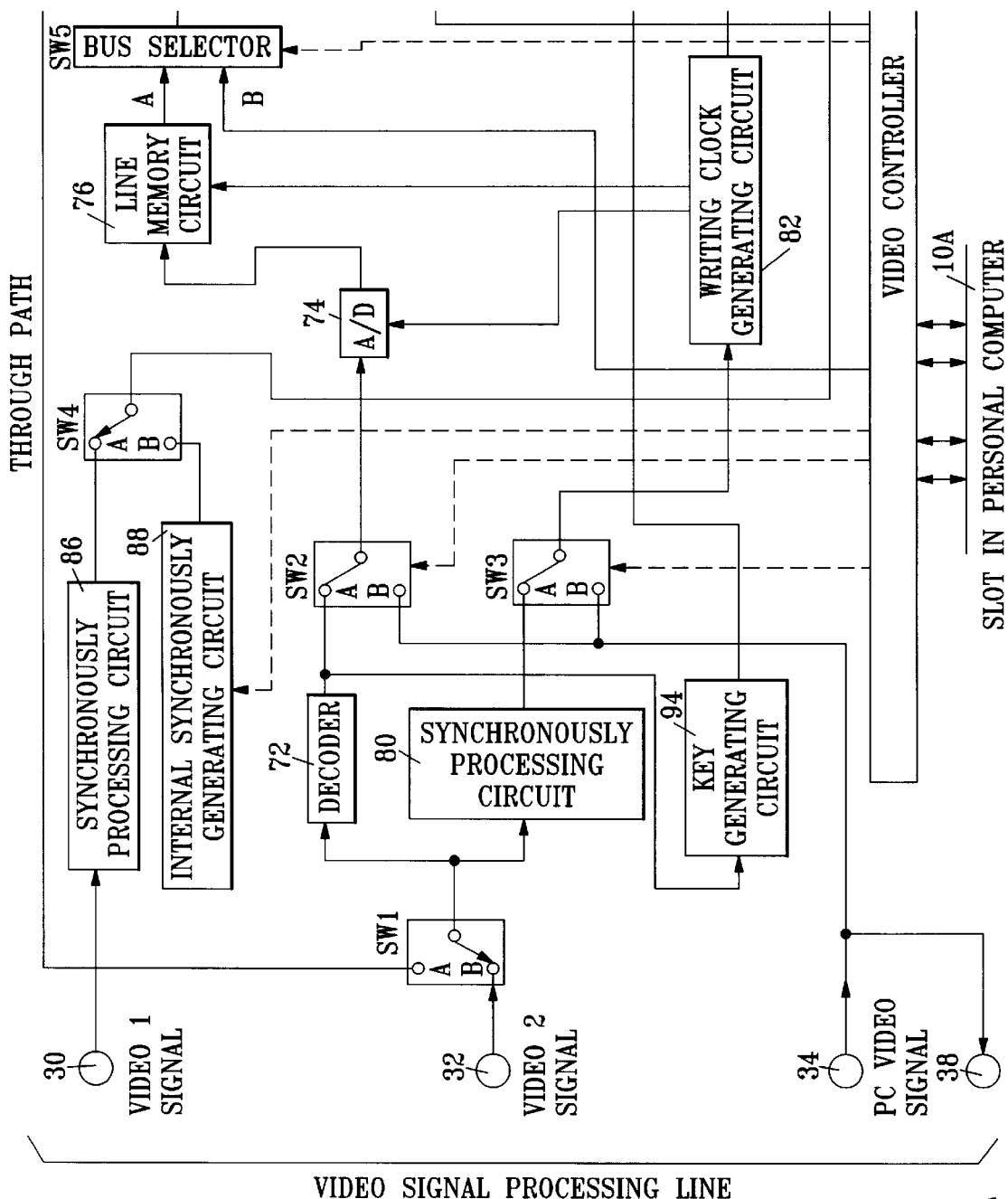
FIG. 2 is a block constitutional diagram showing the hardware structure of a video editor on board of a personal computer.

An example of the manner for embodying the memory control device for video editors according to the present invention will be described in detail hereinbelow by referring to the accompanying drawings.

1. Constitution of System of DTV

FIG. 1 is a conceptual diagram showing an example of the systematic constitution of a DTV employing the video editor provided with the memory control device according to the present invention.

As shown in FIG. 1, in the systematic constitution of the DTV using the video editor provided with the memory control device according to the present invention, it is arranged in such that to a personal computer 10 into which has been incorporated the video editor provided with the memory control device of the present invention, two lines of the video signals as image signals outputted from a video camera 20 or video cassette recorder (VCR) 22 etc. as well as 1 line of the PC video signal produced in the personal computer 10 and the like can be inputted, besides three lines of the audio signals as aural signals outputted from the video camera 20, the VCR 22 or a compact disc player (CD player) 24 etc. can be inputted. Furthermore, it is arranged in such that with respect to the video signals, the PC video signals, and the audio signals inputted to the personal computer 10, processing of edits such as composition of these signals, or addition of effects thereto, besides insertion of a title thereinto is performed by using a keyboard 12 or a mouse 14 each of which is connected to the personal computer 10, and then the video signals and the audio signals are outputted to a TV monitor 26 and a VCR 28 connected to a speaker 27 as the output signals after the same were subjected to the edit processing, whereby the audio and the video signals thus edited are recorded on a videotape by means of the VCR 28 to be capable of video editing, besides to be capable of watching and listening by means of the TV monitor 26 and the speaker 27.

The video signals or the PC video signals inputted are edited while watching a display device 16, and the audio signals inputted are edited while listening sounds from the speaker 18.

In the constitution of the system shown in FIG. 1, the video signal and the audio signal outputted from the video camera 20 are made to be a pair to be used as the first input line of video signal and the first input line of audio signal, respectively, while the video signals and the audio signals outputted from the VCR 22 are made to be a pair to be used as the second input line of video signal and the second input signal of audio signal, respectively.

However, it is not constituted to make the audio signal and the video signal into a pair as in the systematic constitution shown in FIG. 1, but these audio and video signals may, of course, be arranged to be inputted through completely independent input lines, respectively.

In the following description, video signals, PC video signals, and audio signals are inputted through the input lines shown in the systematic constitution of FIG. 1, respectively, and the video signal and the audio signal through the first input line are called "video 1 signal" and "audio 1 signal", respectively, the video signal and the audio signal through the second input line are called "video 2 signal" and "audio 2 signal", respectively, and the audio signal through a third input line is called "AUX signal".

2. Input and Output

Figure 2B:
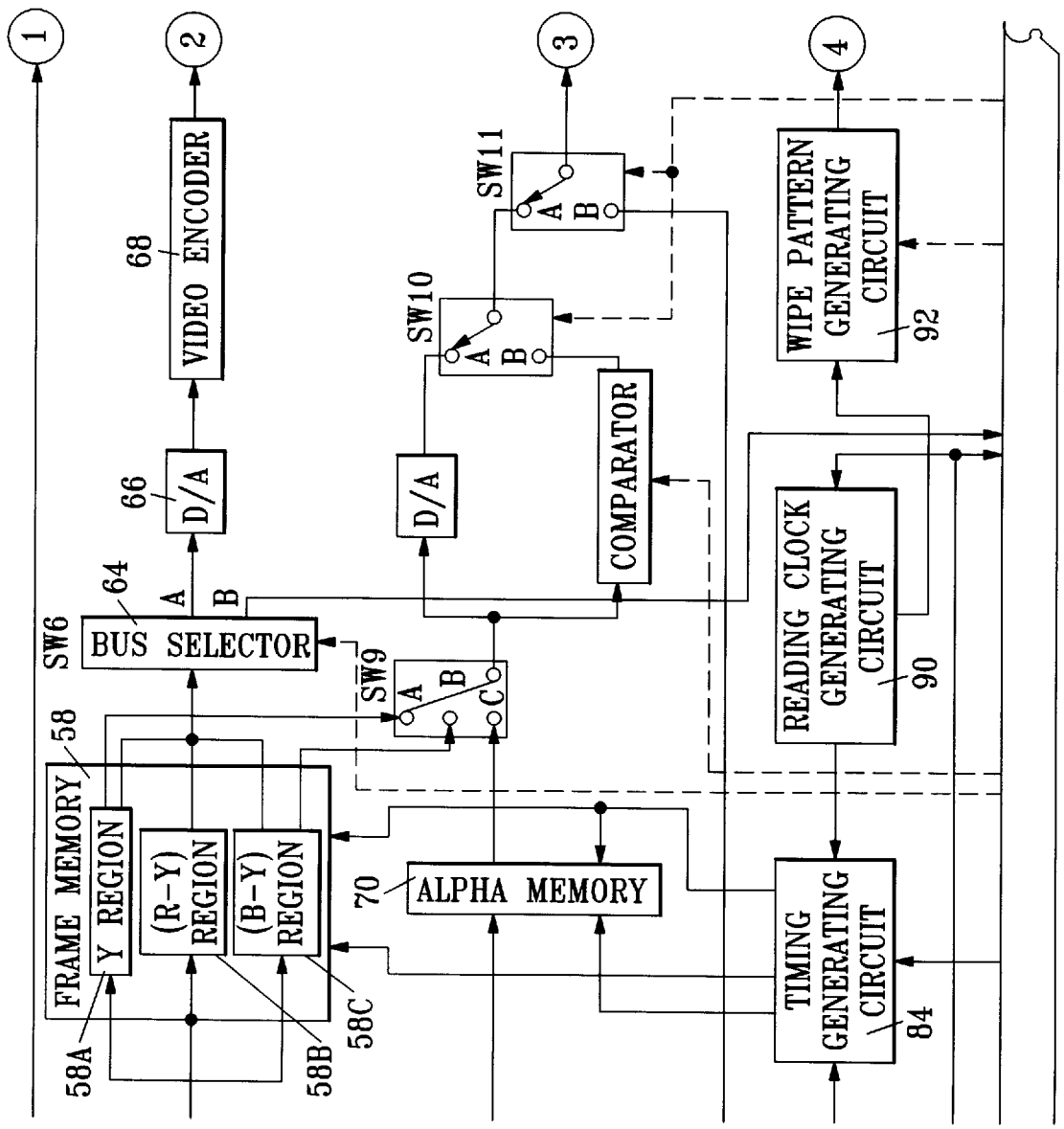
Figure 3:
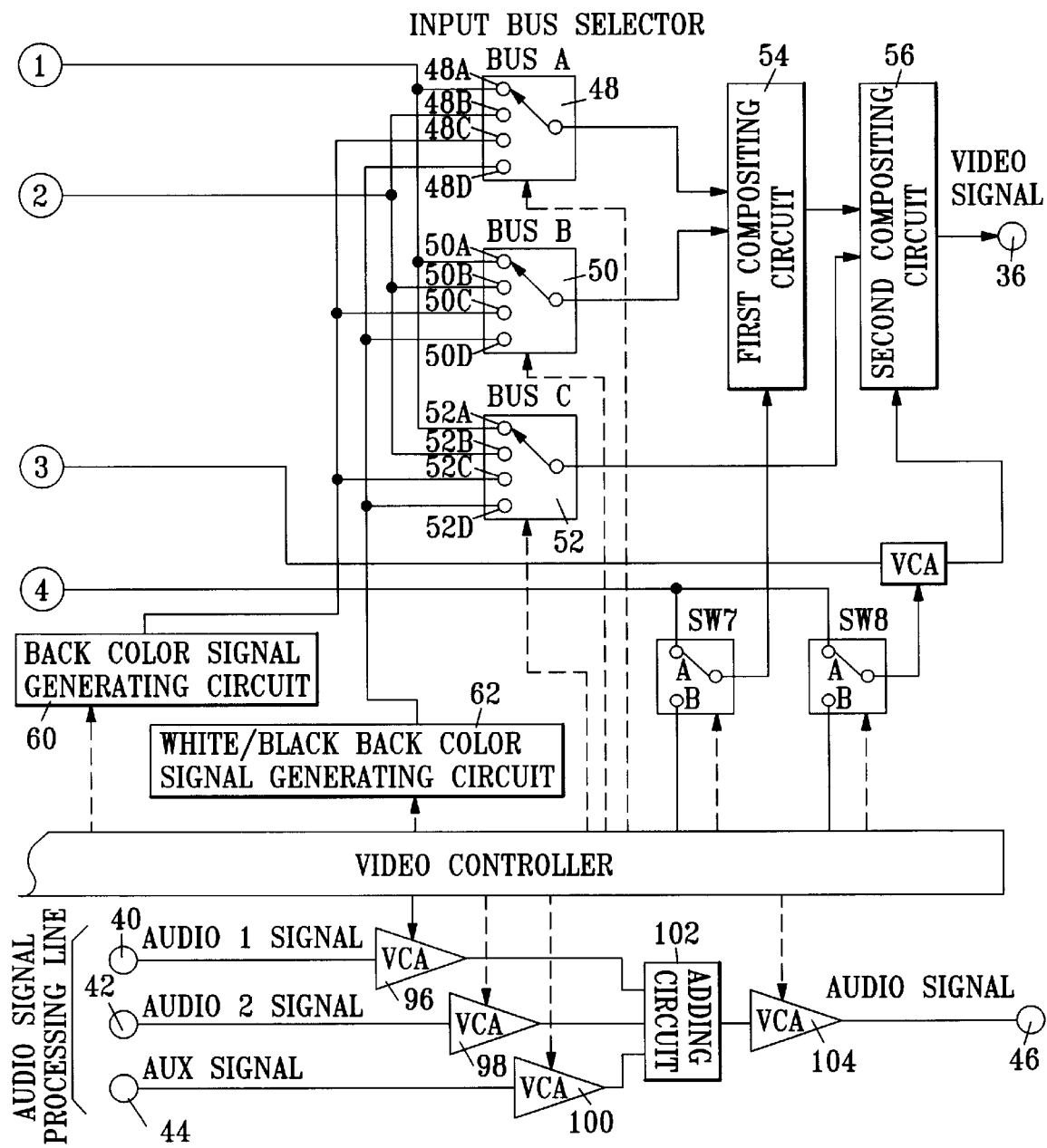
FIG. 3 is a block constitutional diagram showing the hardware structure of a video editor on board of a personal computer.

FIGS. 2 and 3 are block constitutional diagrams each showing the circuit construction of an expansion board to be fitted into an expansion slot 10a of the personal computer 10 (hereinafter referred to as "video board"). Since now-available personal computers have not a facility for processing video signals or audio signals, the circuit as described above is added to a personal computer to thereby process these signals.

Such a video board is provided with input terminals for the above described video signals, the PC video signals, and the audio signals, respectively, and output terminals for outputting the signals after being edited, respectively, as described hereinbelow.

More specifically, a video board is provided with a video 1 signal input terminal 30 and a video 2 signal input terminal 32 as the input terminals for video signals, respectively, as well as with an PC video signal input terminal 34 as the input terminal for PC video signals.

Furthermore, the video board is provided with a video signal output terminal 36 as the output terminal for the video signals processed by the video editor, and a PC video signal output terminal 38 as the output terminal for PC video signals, respectively.

Moreover, the video board is also provided with an audio 1 signal input terminal 40, an audio 2 signal input terminal 42, and an AUX signal input terminal 44 as the input terminals for audio signals, respectively.

In addition to the above, the video board is provided with an audio signal output terminal 46 as the output terminal for the audio signals processed by the video editor.

Figure 4:
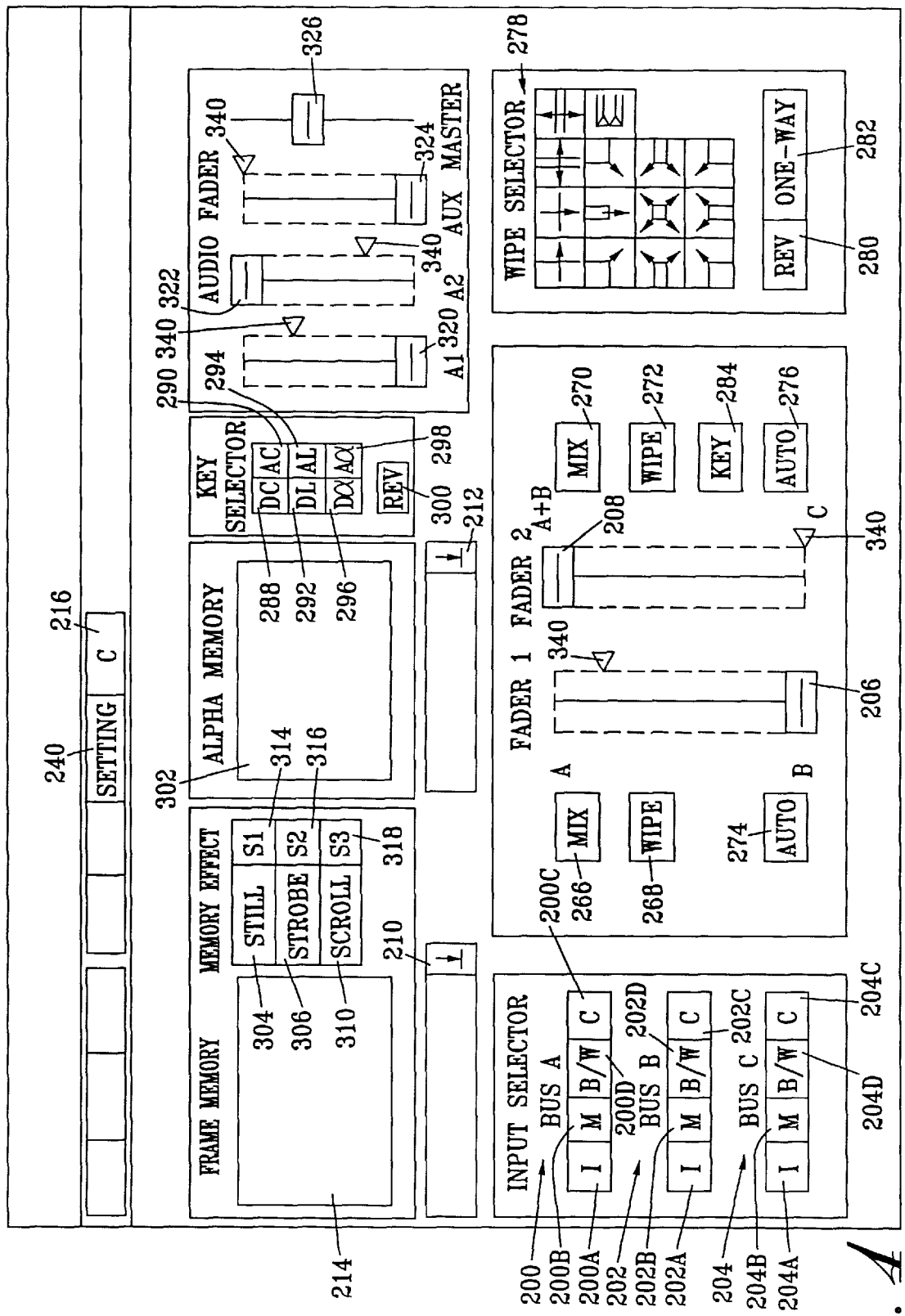
FIG. 4 is an explanatory view showing a console displayed on a display device 16.

Meanwhile, FIG. 4 shows a screen display on the display device 16 in the case where the video editor shown in FIGS. 2 and 3 is started up by means of the personal computer 10 (hereinafter, the screen display on the display device 16 shown in FIG. 4 is referred to as "console"). In the following description, the console shown in FIG. 4 will be also referred to.

It is to be noted that in the present mode for embodying the invention, it is constituted in such that a user can perform an input operation to the video editor by clicking a prescribed position on the console by means of the mouse 14, by inputting a numerical value to a prescribed position on the console by the use of the keyboard 12, or by effecting the like operations.

3. Processing of Image

3-1. Explanation for Video Signal

In the video editor, the addition and the composition of effects can be performed for video signals of three lines of a bus A (BUS A), a bus B (BUS B), and a bus C (BUS C), respectively, to thereby edit the image wherein it is possible to select the video signal for the bus A by an input selector for the bus A 200 (corresponding to an input bus selector for the bus A 48 in FIG. 3) of the console, the video signal for the bus B by an input selector for the bus B 202 (corresponding to an input bus selector for the bus B 50 of FIG. 3), and the video signal for the bus C by an input selector for the bus C 204 (corresponding to an input bus selector for the bus C 52 in FIG. 3), respectively.

In the circumstances, the video signal selected as the bus A is composited with the video signal selected as the bus B in a ratio specified by the position of a knob 206 of the fader 1 in a first compositing circuit 54, and the signal thus composited is outputted to a second compositing circuit 56. In the second compositing circuit 56, the composited signal outputted from the first compositing circuit 54 is composited with the video signal selected as the bus C in a ratio specified by the position of a knob 208 of the fader 2, and the signal thus composited is outputted from the video signal output terminal 36 as the video signal to be outputted to the outside.

Furthermore, the video signal outputted from the video signal output terminal 36 is inputted to the VCR 28 and the TV monitor 26.

3-2. Bus Selector

The video signals to be supplied to the above described respective bus selectors 48, 50, and 52 correspond to those shown in the following Items (1) through (4).

(1) Video 1 signal=The signal which is inputted to the video 1 signal input terminal 30 without passing through a frame memory 58.

(2) Frame memory signal=The video signals obtained by reading the frame memory 58.

(3) Back color signal (video signal with monochrome background) =The signals produced by a back color signal generating circuit 60.

(4) White back signal (video signal with white background) or black back signal (video signal with black background)=The signals produced by a white/black back color signal generating circuit 62.

In these situations, when each of buttons on the console corresponding to the signals of the above described Items (1) through (4), respectively, is clicked, a desired signal can be selected as the signal for each of the input buses.

The term "frame memory 58" used herein means a memory being capable of writing video signals for one frame (picture image), besides capable of reading the written video signals at the different timing from that of the writing the signals. In other words, the frame memory 58 can independently write and read video signals.

The frame memory 58 is composed of a Y region 58*a* for storing a luminance signal Y indicating the luminance component constituting video signals, an (R–Y) region 58*b* for storing a color difference signal (R–Y) obtained by subtracting the luminance signal Y component from an R (red) elementary color signal, and a (B–Y) region 58*c* for storing a color difference signal (B–Y) obtained by subtracting the luminance signal Y component from a B (blue) elementary color signal, and which is in a so-called three-plane composition.

In the following, a more detailed explanation will be made with respect to selecting operations for images based on the above described respective video signals as well as with respect to processing for the video signals in case of performing the aforesaid selecting operations.

3-2-1. Selection of Video 1 Signal

Figure 5:
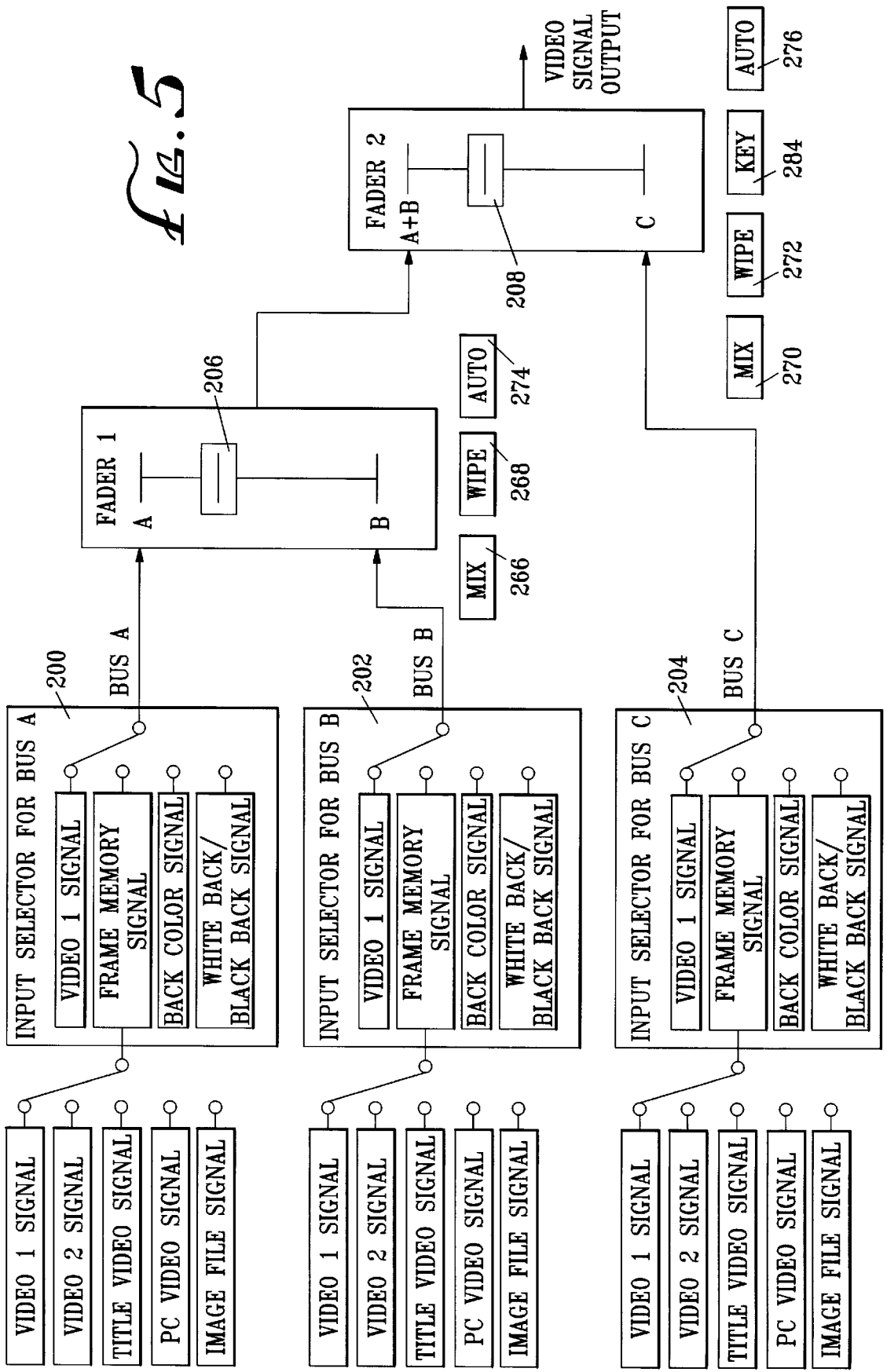
FIG. 5 is a conceptual diagram for explaining a composition of video signals.

The following explanation will be made by referring to FIG. 5 in addition to FIGS. 1 through 4. When a video 1 button 200*a* of the input selector for bus A 200 is clicked, the input bus selector for bus A 48 is switched to the side of a video 1 signal terminal 48*a*.

To the video 1 signal terminal 48 is directly inputted the video 1 signal which was inputted to the video 1 signal input terminal 30 by way of a through path, but not the frame memory 58.

Furthermore, also with respect to the bus B and the bus C, when each of video 1 buttons is similarly clicked to switch each of the input bus selectors corresponding to the respective buses, a video 1 signal is selected.

3-2-2. Selection of Frame Memory Signal

3-2-2-1. Type of Frame Memory Signal

The following explanation will be made by referring also to FIG. 5 in addition to FIGS. 1 through 4. When a frame memory button 200*b* of the input selector for bus A 200 is clicked, the input bus selector for bus A 48 is switched to the side of a frame memory signal terminal 48*b*.

When the data which has been written into the frame memory 58 is read, frame memory signals are inputted to the frame memory signal terminal 48*b* through the path of the frame memory 58→the bus selector 64 (an internal switch SW6)→a digital-to-analog converter 66→a video-encoder 68→the frame memory signal terminal 48*b*.

Then, the following video signals enumerated in Items (1) through (5) can be selected as frame memory signals.

(1) Video 1' signal=Video image due to the video 1 signal through the frame memory 58.

(2) Video 2 signal=Video image due to the video 2 signal through the frame memory 58.

(3) Title video signal=The image signal in a title obtained by reading a title file (the title file consists of title data (the data indicating the character faces in a title) which is written into the frame memory 58 and also is read from the frame memory 58 as frame data and transmittance data (the data indicating the transmittance in the character faces in a title) which is written into an alpha memory 70 and also is read from the alpha memory 70 as alpha data). Namely, the title file is prepared by including the title data and the transmittance data, and which is stored in an external storage device such as a memory, a floppy disk and the like of the personal computer 10.

(4) PC video signal=Video image due to the PC video signal passing through the frame memory 58. In the present mode for embodying the invention, this PC video signal becomes a video signal which is supplied to the display device 16 of the personal computer 10 and displayed thereon.

(5) Image file signal=The signals for a still-frame image obtained by reading an image file comprising the image data for one frame prepared in accordance with capturing processing which will be described hereinbelow as frame data, the image data for one frame prepared by a publicly known image producing device etc., and the like image data. The image file is stored in an external storage device such as a memory, a floppy disk and the like of the personal computer 10.

3-2-2-2. Writing Files into and Reading the Same from Frame Memory and Alpha Memory There are a title file, an image file, and an alpha file as the files which are stored in an external storage device such as a memory, a floppy disk and the like of the personal computer 10 and to be written into the frame memory 58 or the alpha memory 70. It is to be noted that the external storage device such as a memory, a floppy disk and the like, which has stored the title file, the image file, and the alpha file, of the personal computer 10 is hereinafter referred simply to as "file memory".

As described above, the title file is the data for obtaining title video, and the image file is the data for obtaining image file video, but the alpha file is the data indicating luminance and transmittance and which is used in processing or the like in a key signal which will be described hereinbelow.

Data formatting of the title file, the image file, and the alpha file will be described herein. The title file is composed of the frame data and the alpha data, the image file is composed of only the frame data, and the alpha file is composed of only the alpha data.

In the case when the title file, the image file, and the alpha file as described above are read from the file memory and then, written into the frame memory 58 and the alpha memory 70, respectively, a selection for reading which of the title file, the image file, and the alpha file from the file memory as well as a selection for writing the file which has been selected and read into which of the frame memory 58 and the alpha memory 70 can be carried out.

Figure 6:
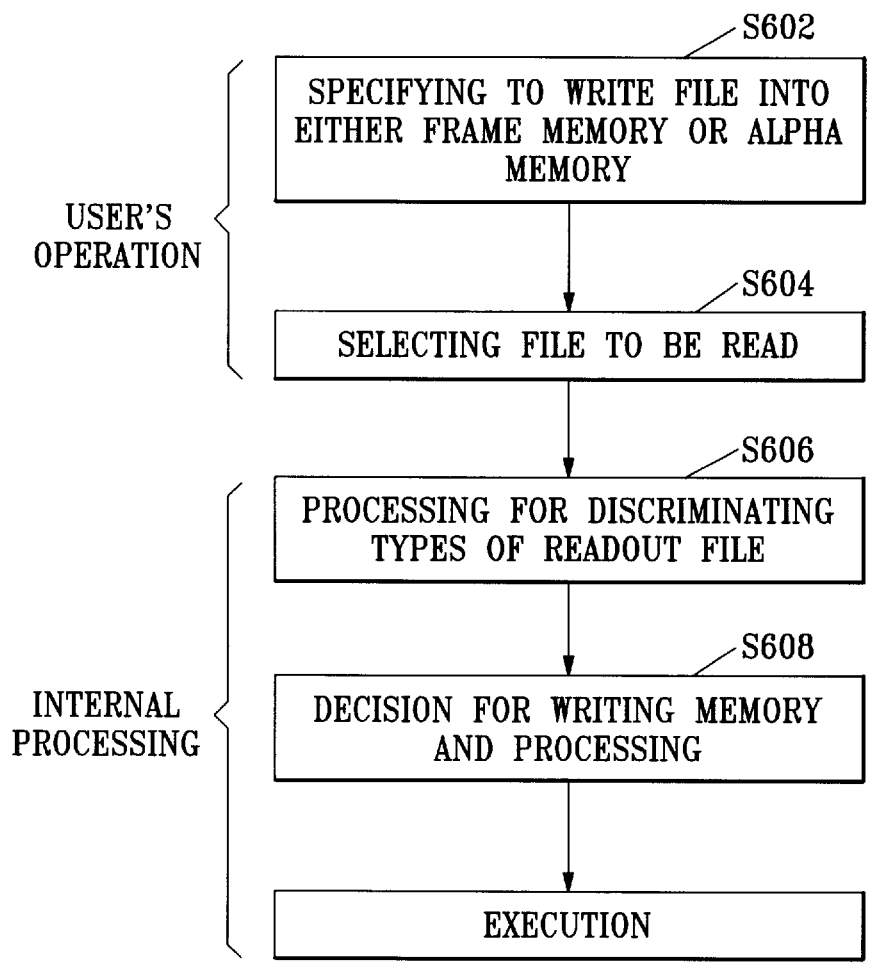
FIG. 6 is a flowchart showing processing for reading a file as well as processing for writing a file into a frame memory and an alpha memory.

More specifically, as shown in the processing flowchart of FIG. 6, a user specifies first that the file read is to be written into which of the frame memory 58 or the alpha memory 70 (step S602). The specification is conducted by clicking a frame memory specifying button 210 or an alpha memory specifying button 212 on its console.

Then, the user selects that which of the title file, the image file, and the alpha file is to be read from the file memory (step S604). The operation for reading a desired file from the file memory will be described in detail hereunder.

Thus, when the operations in the steps S602 and S604 were carried out by the user, discrimination processing for a type of the readout file selected in the step S604 is made (step S606). Furthermore, a memory into which the contents of the readout file is to be written and the processing therefor are decided (step S608), and the corresponding operations are executed (step S610).

It is to be noted that there are six cases dependent upon the selections of steps S602 and S604 as shown in FIG. 7.

Case 1: In the case where the frame memory 58 is specified as a writing memory and the title file is selected as a file read out from the file memory, frame data of the title file, i.e., title data are written into the frame memory 58, while alpha data of the title file, i.e., transmittance data are written into the alpha memory 70. In this case, a title is key-composited by means of an analog-alpha key which will be mentioned hereinafter.

Case 2: In the case where the alpha memory 70 is specified as a writing memory and the title file is selected as a file read out from the file memory, frame data of the title file are not written into the frame memory 58, but alpha data of the title file, i.e., transmittance data are written into the alpha memory 70. In this case, image is key-composited by means of an analog-alpha key which will be mentioned hereunder.

Case 3: In the case where the frame memory 58 is specified as a writing memory and the image file is selected as a file read from the file memory, frame data of the image file, i.e., image data are written into the frame memory 58, and no writing is effected to the alpha memory 70.

Case 4: In the case where the alpha memory 70 is specified as a writing memory and the image file is selected as a file read out from the file memory, no writing is effected to the frame memory 58, but the data which are obtained by gray-scaling frame data of the image file, i.e., image data (8 bits per 1 pixel) are written into the alpha memory 70. In this case, the image file may be converted to an alpha file. In addition, when a digital key which will be mentioned hereunder is selected, a wiping effect which will be also described hereinafter can be obtained, so that when an analog key is selected, the undermentioned transmittance can be attained.

Case 5: In the case where the frame memory 58 is specified as a writing memory and the alpha file is selected as a file read out from the file memory, the data obtained by black-white dataing alpha data of the alpha file are written into the frame memory 58, while no data is written into the alpha memory 70. In this case, the alpha file may be converted to an image file.

Case 6: In the case where the alpha memory 70 is specified as a writing memory and the alpha file is selected as a file read out from the file memory, no data is written into the frame memory 58, but frame data of the alpha file are written into the alpha memory 70. In this case, when a digital key is selected, a wiping effect can be obtained, so that when an analog key is selected, transmittance can be attained.

Figure 8A:
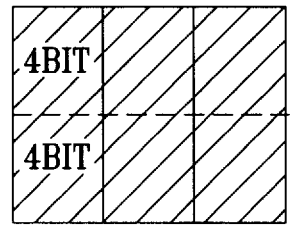
Figure 8B:
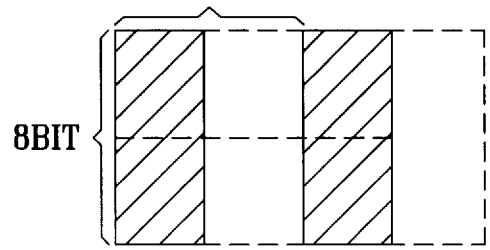
Figure 8C:
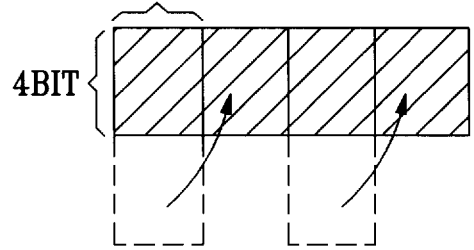

In the above described cases, as illustrated in FIG. 8, in the event when the alpha data written in the alpha memory 70 (FIG. 8(*a*)) are read, it may be arranged in such that reading from the alpha memory 70 is conducted at 8 bits in 2 fsc frequency (fsc: frequency of chrominance subcarrier) to elevate gradient in a digital key mode wherein a digital key is selected, while reading from the alpha memory 70 is effected at 4 bits in 4 fsc frequency to increase resolution in an analog key mode wherein an analog key is selected. As a consequence, preferential processing in respect of gradient or resolution becomes possible by employing a common memory in response to the application.

The reason why the arrangement as described above is taken is in such that it is desirable to increase gradient for attaining a smooth wipe in wipe processing which is conducted in a digital key mode, while it is desirable to elevate resolution for expressing precisely the profiles of characters in compositing a title which is effected in an analog key mode.

3-2-2-3. Method for Selecting Frame Memory Signal

For selecting the signals in the above described Items (1) through (5) as frame memory signals, it is decided that which signal in the above described Items (1) through (5) is used as the signal for any of the buses A through C, and the frame memory button of the input selector in the bus decided is clicked to switch the input bus selector to the side of the frame memory signal.

In this case, when the frame memory button is clicked, a list for selecting frame memory signals is displayed on a part of the console, so that a section corresponding to a desired signal is clicked to select the desired signal.

Meanwhile, in case of selecting a title signal by clicking a "title" section in the display of list for selecting frame memory signals, the title file stored in the file memory is displayed as a list (not shown), so that the title file for the title signal in the list which is intended to select as a frame memory signal is clicked.

On one hand, in case of selecting an image file signal by clicking an "image file" section in the display of list for selecting frame memory signals, the image file stored in the file memory is displayed as a list (not shown), so that the image file for the image file signal in the list which is intended to select as a frame memory signal is clicked.

When the title signal in the title file or the image file signal in the image file which is intended to select is clicked in accordance with the manner as described above, an OK button (not shown) is displayed on the console, so that the OK button is clicked to decide the signal to be selected as a frame memory signal.

When the OK button is clicked as described above, the list for title file or image file is automatically closed to complete the display, so that the title signal due to the title file read or the image file signal due to the image file read is displayed on a frame memory displayed screen 214 in the console.

It is to be noted that the title signal or the image file signal thus selected is displayed on the frame memory displayed screen 214 in the console in only the case where the title signal or the image file signal is selected as a frame memory signal.

In the manner for embodying the invention, the standard screen size of signals due to the data read in the frame memory 58 by selecting the signals in the above described Items (1) through (5) as frame memory signals is "756 (width)×485 (height)" dots. In the case when data of the other size are read, an aspect ratio (a ratio of the horizontal length and the vertical length in screen) is automatically modified. Because of this modification, when the size of data is "640 (width)×480 (height)" dots, a full picture image is displayed on the TV screen.

3-2-2-4. Internal Processing Accompanied with Selection of Frame Memory Signal

The internal processing of a video editor accompanied with operations for selecting the signals in the above described Items (1) through (5) as the aforesaid frame memory signals will be described hereunder by referring to the table shown in FIG. 9.

3-2-2-4-1. Case of Selecting Video 1' Signal

Figure 10:
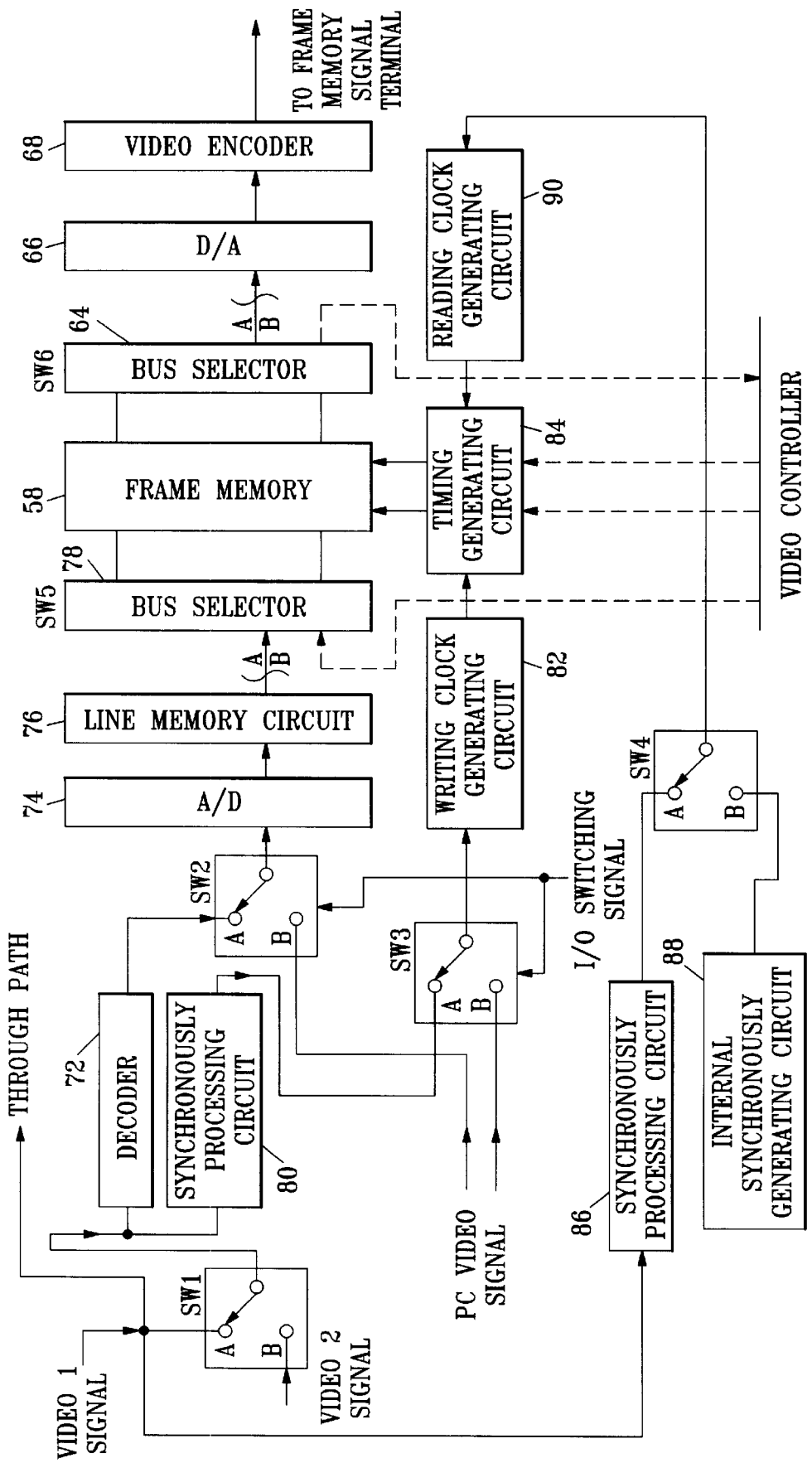
FIG. 10 is an explanatory block constitutional view indicating a transmitting path of signals in case of selecting a video 1' signal.

When the video 1' signal is selected by clicking the "video 1" section displayed on the list for selecting frame memory signals, the internal switches SW1 through SW6 shown in FIG. 2 are switched as in the table shown in FIG. 9, so that the video 1 signal inputted to the video 1 signal input terminal 30 through the transmitting path shown in FIG. 10 is outputted as the video signal to be outputted to the frame memory signal terminals 48b, 50b, and 52b, respectively.

More specifically, the video 1 signal which was inputted to the video 1 signal input terminal 30 is branched into three lines, and one line of the video 1 signal among the branched lines thereof is further branched into two lines after passing the same through the internal SW1 (which has been switched to the side a). One line of the video 1 signal in the branched lines thereof is inputted to a decoder 72, and the video 1 signal inputted is subjected to color separation by means of the decoder 72 into a luminance signal Y, a color difference signal (R–Y) and a color difference signal (B–Y), respectively. Thereafter, these signals are supplied through the following route, i.e., a decoder 72→the internal switch SW2 (which has been switched to the side a)→an analog-to-digital converter 74→a line memory circuit 76→a bus selector 78 (the internal switch SW5: which has been switched to the side a)→the frame memory 58→the bus selector 64 (the internal switch SW6: which has been switched to the side a→the digital-to-analog converter 66→the video-encoder 68→frame memory signal terminals 48b, 50b, and 52b, respectively.

In the circumstances, timing for writing the video 1 signal into the frame memory 58 as well as timing for reading the video 1 signal from the frame memory 58 into which has been written the same are made in accordance with the timing of clocks produced on the basis of the video 1 signal which was inputted to the video 1 signal input terminal 30.

First, the timing for writing the video 1 signal into the frame memory 58 will be described. The other line of video 1 signal in the two branched lines thereof is inputted from the internal SW1 (which has been switched to the side a) to a writing clock generating circuit 82 through the route of a synchronously processing circuit 80 the internal switch SW3 (which has been switched to the side a), and writing clocks into the frame memory 58 are produced therein based on the video 1 signal.

The resulting writing clocks are inputted to a timing generating circuit 84 to generate writing timing.

Next, timing for reading video signals will be described. After the video signals were inputted to the video 1 signal input terminal 30, one line of the video 1 signal in the three branched lines thereof is inputted to the internal switch SW4 through a synchronously processing circuit 86.

In this manner for embodying the invention, the presence of the fact that there is an input of video signals to the video 1 signal input terminal 30 is detected herein. In this connection, there is such a constitution that the internal switch SW4 is forcibly switched to the side a in the case where video signals have been inputted to the video 1 signal input 30, while the internal switch SW4 is forcibly switched to the side b in the case where video signals have not been inputted to the video 1 signal input terminal 30. (As a matter of course, the present invention is not limited to the constitution shown in this manner for embodying the invention, but it may be arranged in such that switching of the internal switch SW4 between the sides a and b (To the side b is connected an internal synchronization generating circuit 88.) is arbitrarily carried out.)

Thus, the video 1 signal which has been inputted to the internal switch SW4 through a synchronously processing circuit 86 is inputted to a reading clock generating circuit 90, so that reading clocks from the frame memory 58 are generated therein on the basis of the video 1 signal.

The reading clocks thus generated are inputted to the timing generating circuit 84, so that reading timing is produced.

3-2-2-4-2. Case of Selecting Video 2 Signal 3-2-2-4-2-1. Case of Having Not Been Inputted Video 1 Signal to Video 1 Signal Input Terminal 30 (The case where the internal switch SW4 has been switched to side b)

Figure 11:
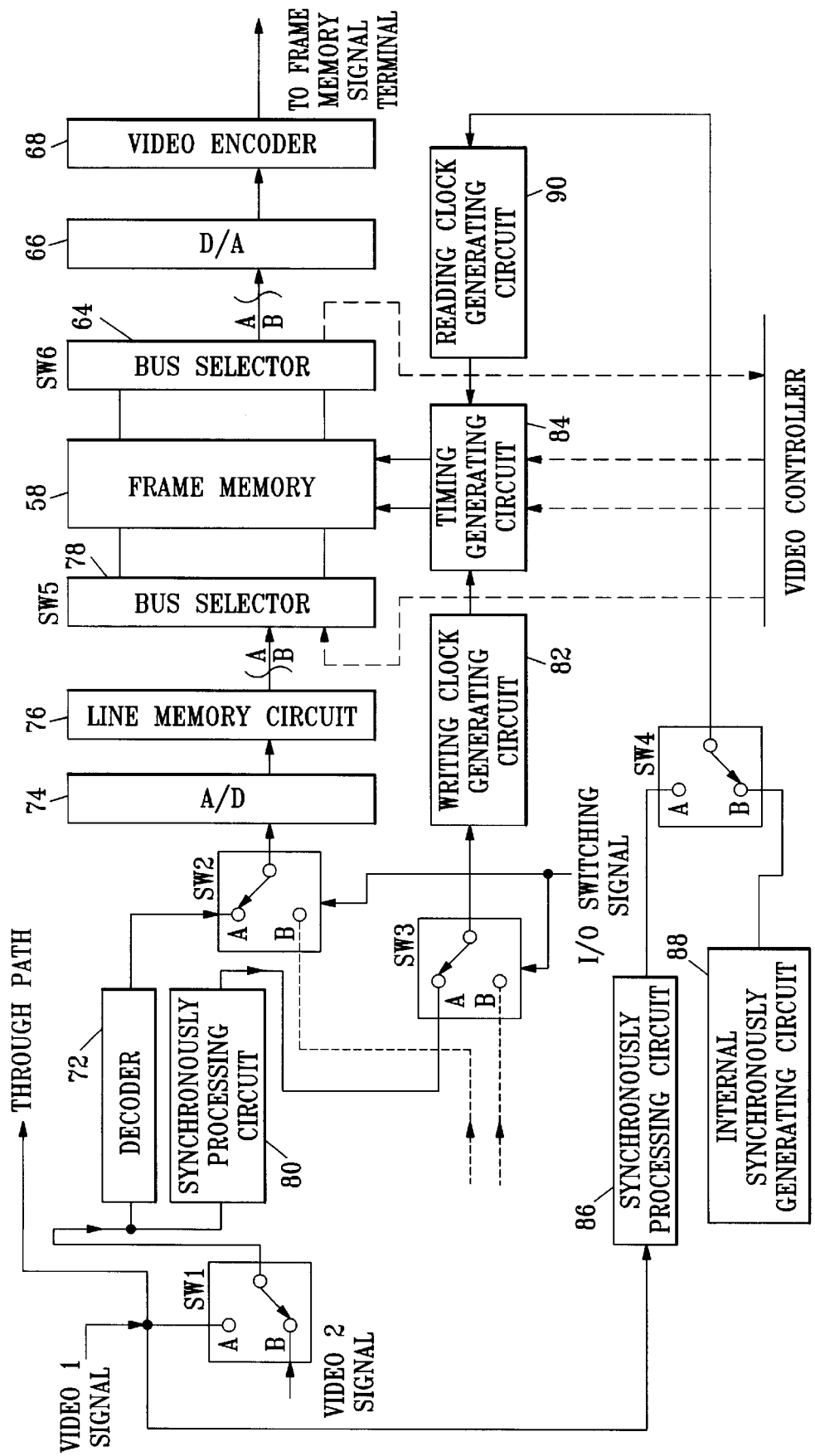
FIG. 11 is an explanatory block constitutional view indicating a transmitting path of signals in case of selecting a video 2 signal and in a state where a video controller functions as a time base collector (TBC).

When the video 2 signal is selected by clicking a "video 2" section on the display of a list for selecting frame memory signals, the internal switches SW1 through SW6 shown in FIG. 2 are switched in the table as shown in FIG. 9, and a video controller functions as a time base collector (TBC), so that the video 2 signal which has been inputted to the video 2 signal input terminal 32 through the transmission path shown in FIG. 11 is outputted as the video signal to be outputted to the frame memory signal terminals 48b, 50b, and 52b, respectively.

More specifically, the video 2 signal which was inputted to the video 2 signal input terminal 32 is branched into two lines after passing the same through the internal switch SW1 (which has been switched to the side b). The video 2 signal being one of the branched lines is supplied through the route, i.e., the decoder 72→the internal switch SW2 (which has been switched to the side a)→the analog-to-digital converter 74→the line memory circuit 76→the bus selector 78 (the internal switch SW5: which has been switched to the side a)→the frame memory 58→the bus selector 64 (the internal switch SW6: which has been switched to the side a→the digital-to-analog converter 66→the video-encoder 68→the frame memory signal terminals 48b, 50b, and 52b, respectively.

In these circumstances, timing for writing the video 2 signal into the frame memory 58 is made in accordance with the timing of clocks produced on the basis of the video 2 signal which was inputted to the video 2 signal input terminal 32, while timing for reading the video 2 signal from the frame memory 58 into which has been written the same are made in accordance with the timing of clocks produced on the basis of the internal synchronization generating circuit 88 for generating synchronization of video signals.

First, the timing for writing the video 2 signal into the frame memory 58 will be described. The other line of video 2 signal in the branched two lines is inputted from the internal SW1 (which has been switched to the side b) is inputted to the writing clock generating circuit 82 through the route of the synchronously processing circuit 80→the internal switch SW3 (which has been switched to the side a), and writing clocks into the frame memory 58 are produced therein based on the video 2 signal.

In the following, timing for reading the video 2 signal which has been written in the frame memory 58 as described above will be explained. Since no video 1 signal is inputted to the video 1 signal input terminal 30 at present, the internal switch SW4 is switched to the side b, so that stable synchronous timing for video signal which was produced by the internal synchronization generating circuit 88 is inputted to the reading clock generating circuit 90, and therein reading clocks from the frame memory 58 are produced on the basis of the timing for video signal.

As described above, when a video controller functions as a TBC, reading of the video 2 signal even if which is unstable signal and which has been written in the frame memory 58 can be conducted in accordance with the timing for clocks produced on the basis of synchronous timing for stable video signal by employing the internal synchronization generating circuit 88. As a result, stable signals can be obtained as the video signal to be supplied to the frame memory signal terminals 48b, 50b, and 52b.

3-2-2-4-2-2. Case of Having Been Inputted Video 1 Signal to Video 1 Signal Input Terminal 30 (The case where internal switch SW4 has been switched to side a)

Figure 12:
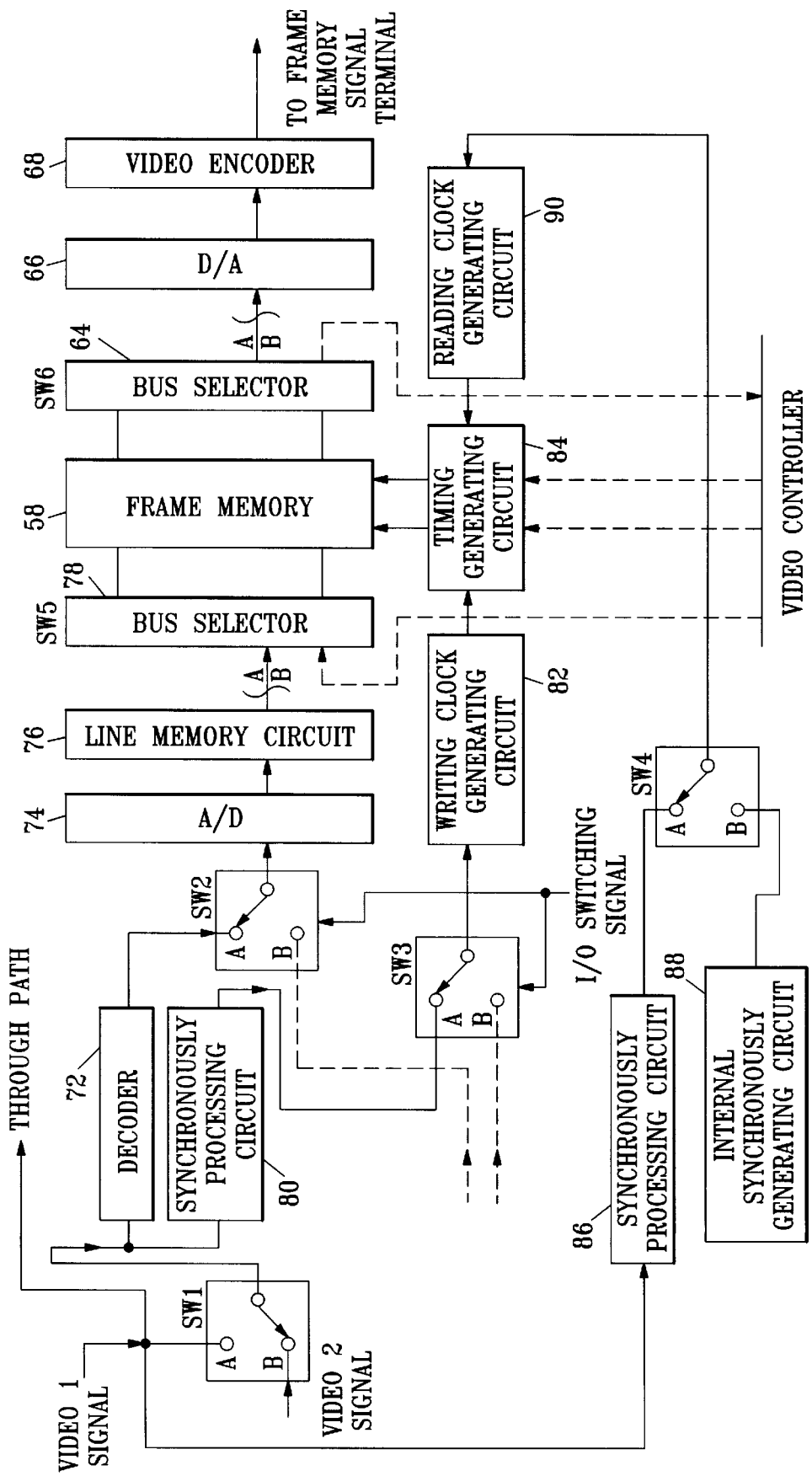
FIG. 12 is an explanatory block constitutional view indicating a transmitting path of signals in case of selecting a video 2 signal and in a state where a video controller functions as a frame synchronizer.

When the video 2 signal is selected by clicking a "video 2" section on the display of a list for selecting frame memory signals, the internal switches SW1 through SW6 shown in FIG. 2 are switched in the table as shown in FIG. 9, and a video controller functions as a frame synchronizer, so that the video 2 signal which has been inputted to the video 2 signal input terminal 32 through the transmission path shown in FIG. 12 is outputted as the video signal to be outputted to the frame memory signal terminals 48b, 50b, and 52b, respectively.

Under the circumstances, when the case where a video controller functions as a TBC with the case where the former functions as a frame synchronizer, there is only a difference in switching of the internal switch SW4. In other words, the case where a video controller functions as a TBC differs from the case where the former functions as a frame synchronizer in only the signal which becomes the base of reading clocks for the video 2 signal stored in the frame memory 58, and the other constitutions are the same with each other.

More specifically, in the case where a video controller functions as a TBC, the internal switch SW4 is switched to the the side b, and stable reading clocks are produced on the basis of the stable synchronous signal generated by the internal synchronization generating circuit 88, whereby the video 2 signal which has been stored in the frame memory 58 is read in accordance with the resulting stable reading clocks.

On the other hand, in the case where a video controller functions as a frame synchronizer, the internal switch SW4 is switched to the side a, and reading clocks are produced on the basis of the video 1 signal which has been inputted to the video 1 signal input terminal 30, whereby the video 2 signal which has been stored in the frame memory 58 is read in synchronous with the aforesaid basic video 1 signal.

Thus, in case of functioning a video controller as a frame synchronizer, it becomes possible to synchronize the signals derived from the video 2 signal with those derived from the video 1 signal.

3-2-2-4-3. Case of Selecting Title Signal

The case will be described later in the paragraphs of the explanation for addition of a variety of effects with respect to video signals.

3-2-2-4-4. Case of Selecting PC Video Signal

Figure 13:
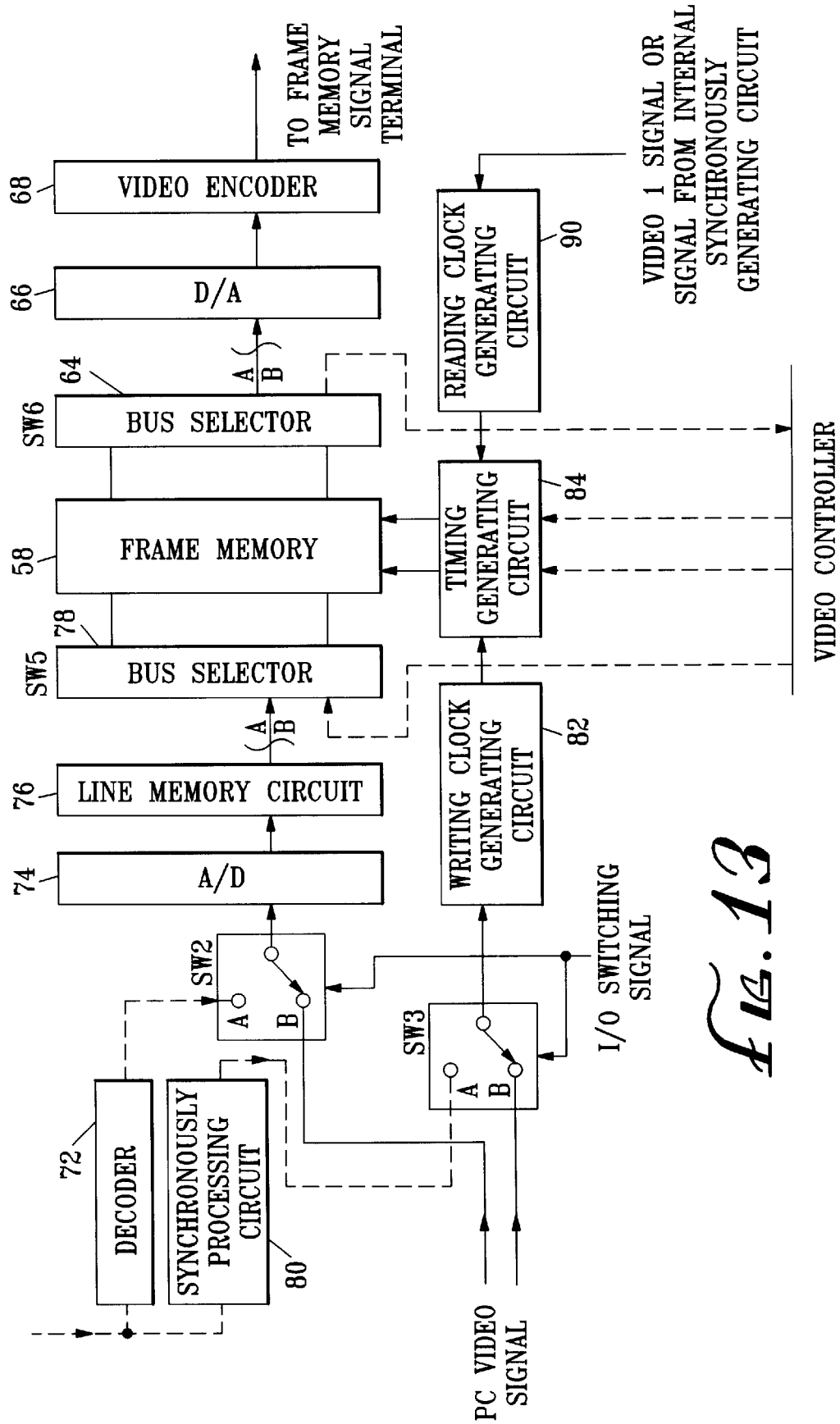
FIG. 13 is an explanatory block constitutional view indicating a transmitting path of signals in case of selecting a PC video signal and in a state where a video controller functions as a scan converter.

When a PC video signal is selected by clicking a "scan converter" section on the display of a list for selecting frame memory signals, the internal switches SW1 through SW6 (Concerning the internal switch SW4, it is switched to the side a in the case where the video 1 signal is inputted to the video 1 signal input terminal 30, while the switch is changed over the side b in the case where no video 1 signal is inputted to the video 1 signal input terminal 30.) shown in FIG. 2 are switched in the table as shown in FIG. 9, and a video controller functions as a scan converter, so that the PC video signal which has been inputted to the PC video signal input terminal 34 through the transmission path shown in FIG. 13 is converted to video signal and is outputted to the frame memory signal terminals 48b, 50b, and 52b, respectively.

More specifically, the PC video signal which was inputted to the PC video signal input terminal 34 is branched into two lines thereof, and they are inputted to the internal switch SW2 (which has been switched to the side b) and the internal switch SW3 (which has been switched to the side b), respectively. The PC video signal which was inputted to the internal switch SW2 is supplied through the route, i.e., the analog-to-digital converter 74→the line memory circuit 76→the bus selector 78 (the internal switch SW5: which has been switched to the side a)→the frame memory 58→the bus selector 64 (the internal switch SW6: which has been switched to the side a→the digital-to-analog converter 66→the video-encoder 68→the frame memory signal terminals 48b, 50b, and 52b, respectively.

In these circumstances, timing for writing the PC video signal into the frame memory 58 is made in accordance with the timing of clocks produced on the basis of the PC video signal which was inputted to the PC video signal input terminal 34, while timing for reading the PC video signal from the frame memory 58 into which has been written the same are made in accordance with the timing of clocks produced on the basis of the video 1 signal which has been inputted to the video 1 signal input terminal 30 in the case where the video 1 signal is inputted to the video 1 signal input terminal 30, while the timing for reading the PC video signal is made in accordance with the timing of clocks produced based on the internal synchronization generating circuit 88 for generating synchronization of video signals.

When the timing for writing the PC video signal into the frame memory 58 is described, one line of the PC video signal in the branched two lines thereof which had been branched as a result of inputting to the PC video signal input terminal 34 is inputted to the writing clock generating circuit 82 through the internal switch SW3 (which has been switched to the side b), and therein writing clocks into the frame memory 58 are produced based on the PC video signal.

Figure 14:
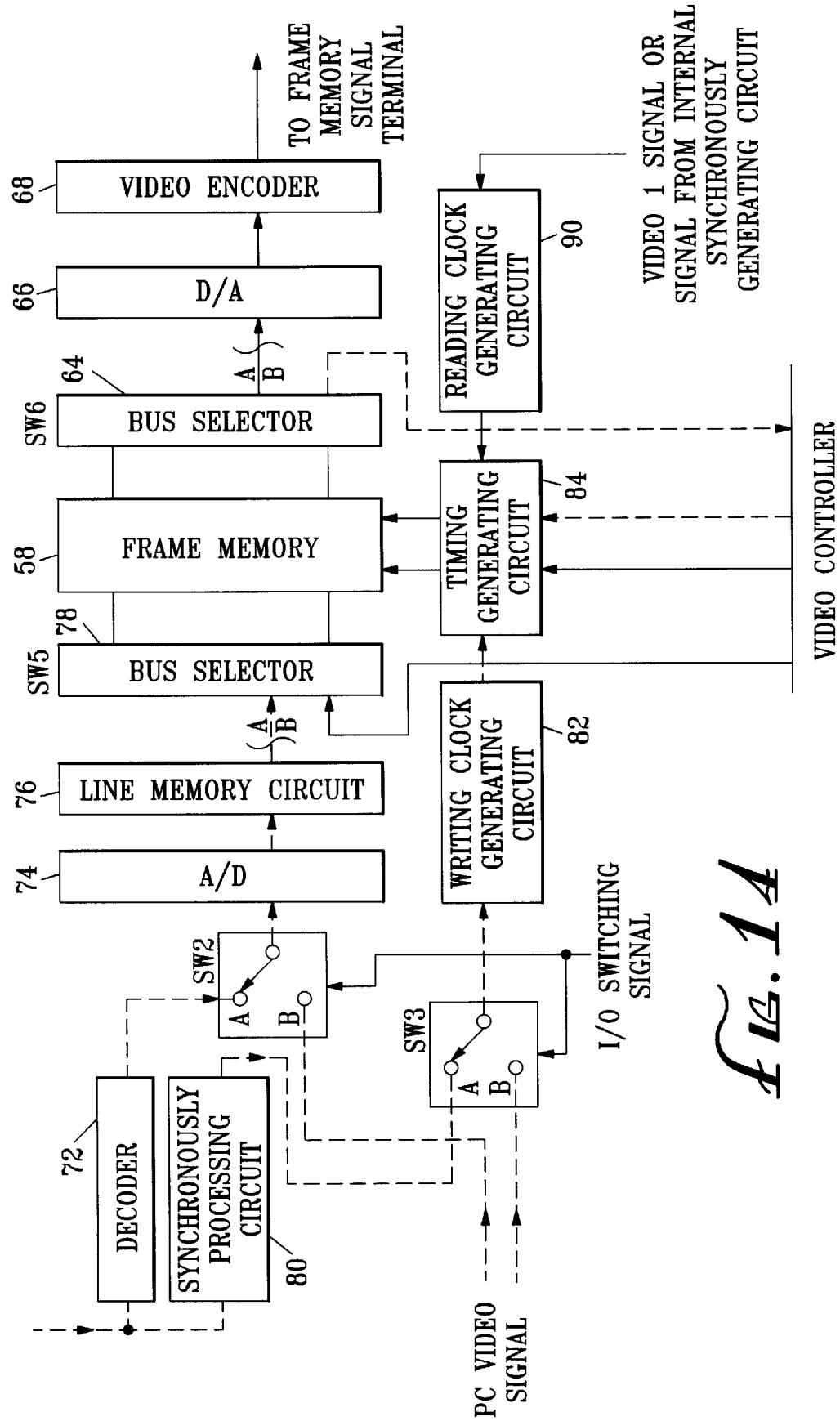
FIG. 14 is an explanatory block constitutional view indicating a transmitting path of signals in case of selecting an image file signal and in a state where a video controller functions as a frame buffer.

3-2-2-4-5. Case of Selecting Image File Signal
3-2-2-4-5-1. Reading of Image File When an image file signal is selected by clicking a "image file" section on the display of a list for selecting frame memory signals, the internal switches SW1 through SW6 (Concerning the internal switch SW4, it is switched to the side a in the case where the video 1 signal is inputted to the video 1 signal input terminal 30, while the switch is changed over the side b in the case where no video 1 signal is inputted to the video 1 signal input terminal 30.) shown in FIG. 2 are switched in the table as shown in FIG. 9, and a video controller functions as a frame buffer, so that an image file (image data for 1 frame) which has been stored in a file memory is outputted through the transmission path shown in FIG. 14 as video signals to be outputted to the frame memory signal terminals 48b, 50b, and 52b, respectively.

More specifically, the image file stored in the file memory is read into the frame memory 58 by means of an I/O interface through the bus selector 78 (the internal switch SW5: which has been switched to the side b), and then the image file is supplied through the route, i.e., the frame memory 58→the bus selector 64 (the internal switch SW6: which has been switched to the side a) →the digital-to-analog converter 66→the video-encoder 68→the frame memory signal terminals 48b, 50b, and 52b, respectively.

In these circumstances, timing for writing the image file into the frame memory 58 is made in accordance with the timing of clocks produced by the personal computer 10. On one hand, timing for reading the image file which has been written into the frame memory 58 is made in accordance with the timing of clocks produced on the basis of the video 1 signal which has been inputted to the video 1 signal input terminal 30 in the case where the video 1 signal is inputted to the video 1 signal input terminal 30, while the timing for reading the image file is made in accordance with the timing of clocks produced based on the internal synchronization generating circuit 88 for generating synchronization of video signals in the case where no video 1 signal is inputted to the video 1 signal input terminal 30.

First, when the timing for writing the image file into the frame memory 58 is described, the writing clocks produced by the personal computer 10 are outputted to a timing generating circuit 84, and the timing generating circuit 84 produces the timing for writing the image file into the frame memory 58 to thereby write the image file into the frame memory 58.

Under the circumstances, in the case where a video controller performs the operations in the above described frame buffer, the bus selector 78 (the internal switch SW5) has been switched to the side b to inhibit inputting of such image signals directing to the frame memory 58 through the analog-to-digital circuit 74, and the same image file for 1 frame as that described above is read into and maintained in the frame memory 58. Thus, the image file for 1 frame maintained in the frame memory 58 is repeatedly read in response to the timing of video signals.

In this case, a still-frame image is displayed on the frame memory displaying screen 214 of console.

3-2-2-4-5-2. Capturing Processing

Processing of capturing signals means the processing for storing a desired frame of the video 1' signal or the video 2 signal in a file memory as a still-frame image in a bitmap form of 24 bits.

Operations for carrying out the capturing processing will be described. When a capturing button (C button) 216 of its console is double-clicked to select capturing processing, the windows shown in FIG. 15 are displayed on the screen of the display device 16.

Figure 15:
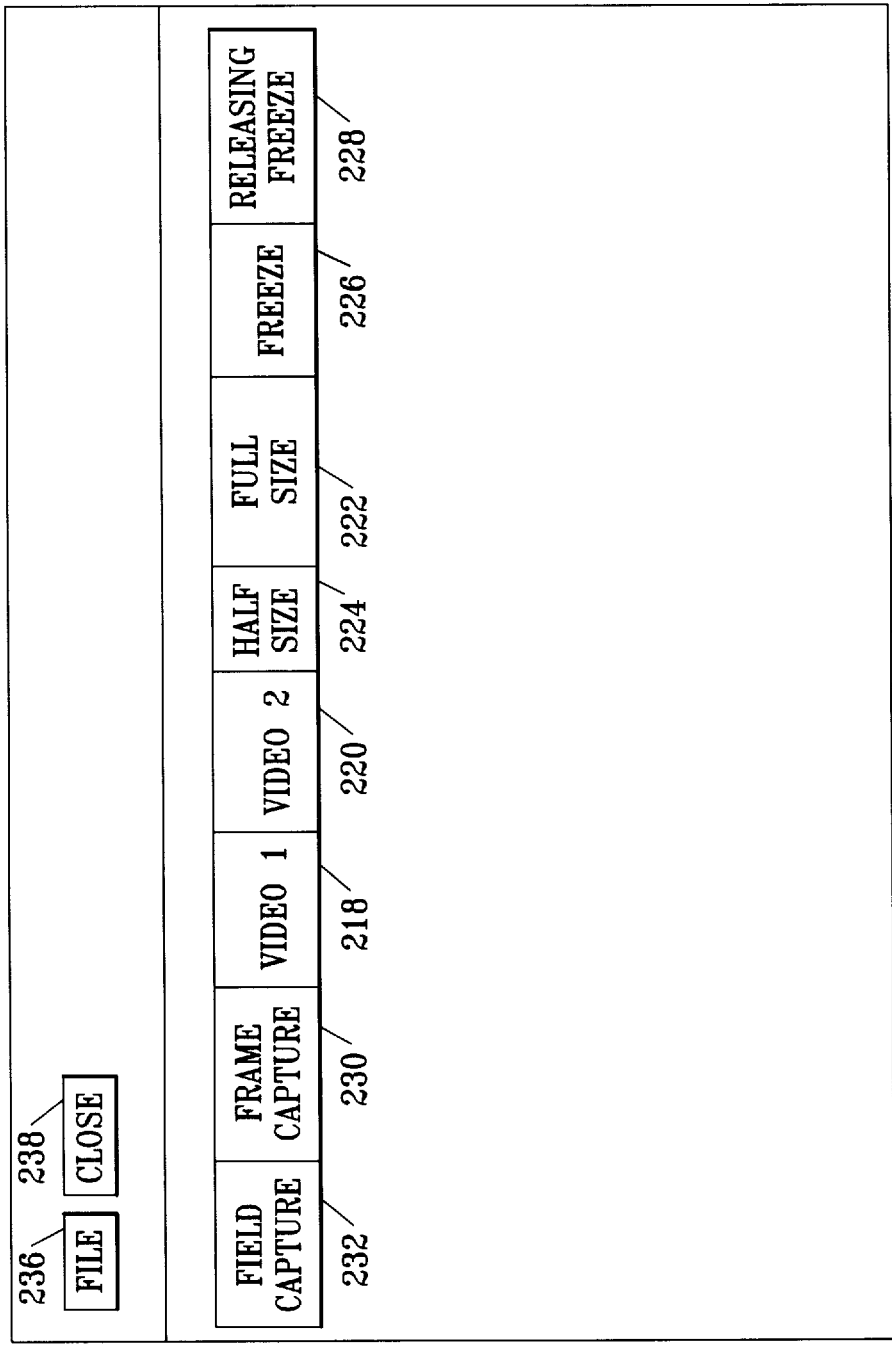
FIG. 15 is an explanatory view showing windows for capturing processing displayed on a display device.
Figure 16:
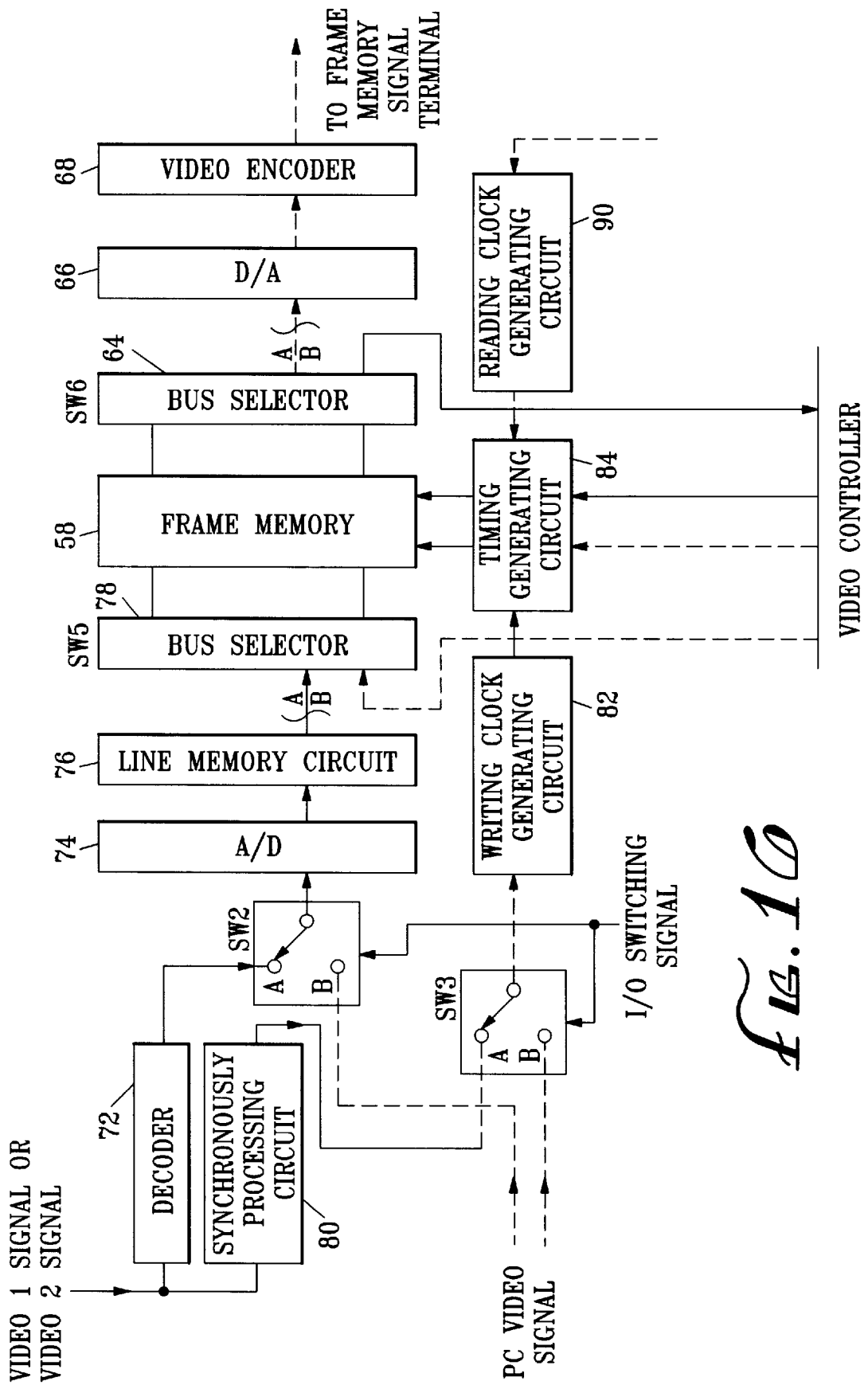
FIG. 16 is an explanatory block constitutional view indicating a transmitting path of signals in capturing processing.

Then, it is decided that either the video 1' signal or the video 2 signal is the one to be captured, and the button corresponding to the video signal decided on the tool bar displayed in the windows shown in FIG. 15 is clicked. More specifically, a video 1 button 218 is clicked in case of selecting the video 1' signal, while a video 2 button 220 is clicked in case of selecting the video 2 signal.

As a consequence, when the video 1 button 218 is clicked, the transmission path for the video 1 signal shown in FIG. 10 is constituted, whereby the video 1' signal is displayed on the TV monitor 26, while when the video 2 button 220 is clicked, the transmission path of the video 2 signal shown in FIG. 11 or FIG. 12 is constituted, whereby the video 2 signal is displayed on the TV monitor 26.

Thereafter, a size of picture image in case of converting to an image file is decided, a button corresponding to the desired size of picture image on the tool bar displayed in the windows is selected and clicked. More specifically, a full size button 222 is clicked in the case where it is intended to display the picture image on the screen of the TV monitor 26 with the full size (756×485 dots), while a half size button 224 is clicked in the case where it is intended to display the picture image on the screen with a size corresponding to ¼ (378×243 dots) of the TV monitor 26.

Then, the image displayed on the TV monitor 26 is continued to view, and at the time when the image being desired to store as an image file in the file memory appears on the TV monitor 26, a freeze button 226 is clicked. Thus, when the freeze button 226 was clicked, the image at the time when clicking of the freeze button 226 is made is displayed on the TV monitor 26 as a still-frame image.

In the case where timing for clicking the freeze button 226 is delayed so that a different image from that desired is displayed on the TV monitor 26 as the still-frame image, a freeze-releasing button 288 may be clicked to cancel the still-frame image displayed on the TV monitor 26 at that time, whereby a state of the image displayed on the TV monitor 26 is returned to the one which is the state before clicking the freeze button 226. Thereafter, the operation for obtaining a desired still-frame image on the TV monitor 26 is repeated by clicking once the freeze button 226.

If a desired still-frame image could be obtained by clicking the freeze button 226, the resulting still-frame image obtained as a result of clicking the freeze button 226 is frame-captured (in case of clicking a frame capturing button 230) or field-captured (in case of clicking a field capturing button 232) in a still-frame image displaying region 234 in the windows shown in FIG. 15 by clicking the frame capturing button 230 or the field capturing button 232.

In this case, a clearer still-frame image can be displayed in the still-frame displaying region 234 by a frame capturing manner in which the frame capturing button 230 is clicked. However, if a still-frame image attained by the frame capturing manner is out of focus, a field capturing manner in which the field capturing button 232 is clicked is applied.

Now, an explanation will be made in respect of frame capturing and field capturing. In color television broadcasting, there are NTSC system, PAL system, and SECAM system. In Japan, the NTSC system has been adopted. In the NTSC system, a manner of interscanning wherein one frame (picture image) is displayed with two fields (scanning lines) is used. The manner of frame capturing is the one wherein the image utilizing these two fields is captured without any modification, so that a still-frame image having high quality can be obtained in the still-frame image displaying region 234, and on the other hand, there is a case where the still-frame image which has been captured in the still-frame displaying region 234 comes to be out of focus, because changes in the picture image belonging to two fields increase in the case where motion of the image is fast.

On one hand, in field capturing, an image belonging to one filed is produced from the one belonging to the other field, so that a stable still-frame image can be captured even from an image of fast motion, but the resulting image has inferior picture quality as compared with that of frame capturing.

In order to store and save the picture image captured in an image file, a file button 236 in the windows shown in FIG. 15 is clicked to open a menu of the file, "saving after assigning a name" section (not shown) is clicked, so that a dialog (not shown) for specifying a saving location (drive/directory) and a file name is allowed to display, and such saving location (drive/directory) and such file name are specified, thereafter an OK button (not shown) is clicked, whereby the image file of the still-frame image displayed on the still-frame image displaying region 234 is saved in the file memory.

In accordance with the operation as described above, an image file for the still-frame image of a desired image of the video 1' signal or the video 2 signal can be stored in the file memory.

To finish the capturing processing, a button 238 for closing the windows shown in FIG. 15 may be clicked.

It is to be noted that only the writing of image file in an amount of 1 frame synchronized with the operation timing of the freeze button in the above described capturing processing is carried out with respect to the writing of the video 1 signal or the video 2 signal into the frame memory 58, so that such writing of the video 1 signal or the video 2 signal into the frame memory 58 is inhibited at the time when the writing of the video 1 signal or the video 2 signal in the amount of 1 frame was finished.

In the case where the video 1 signal or the video 2 signal in the amount of 1 frame which has been written into the frame memory 58 is read and is made to store in an image file of the frame memory, the operation is conducted in accordance with the timing of clocks produced by the timing of the personal computer 10.

As a consequence, image data of the still-frame image which has been captured by capturing processing are stored in the file memory as an image file.

3-2-3. Selection for Back Color Signal

The back color signal is selected in case of using a monochrome background as the video image, and the explanation therefor will be made by referring also to FIG. 5 in addition to FIGS. 1 through 4. When a back color button 200c of the input selector for bus A 200 is clicked, the input bus selector for bus A 48 is switched to the side of a back color video terminal 48c.

To the back color signal terminal 48c is inputted the back color signal which was produced by a back color signal generating circuit 60.

It is to be noted that the back color signal is selected in case of employing a monochrome background as described above, and a color of the back color can arbitrarily be set in accordance with the following operations.

Figure 17:
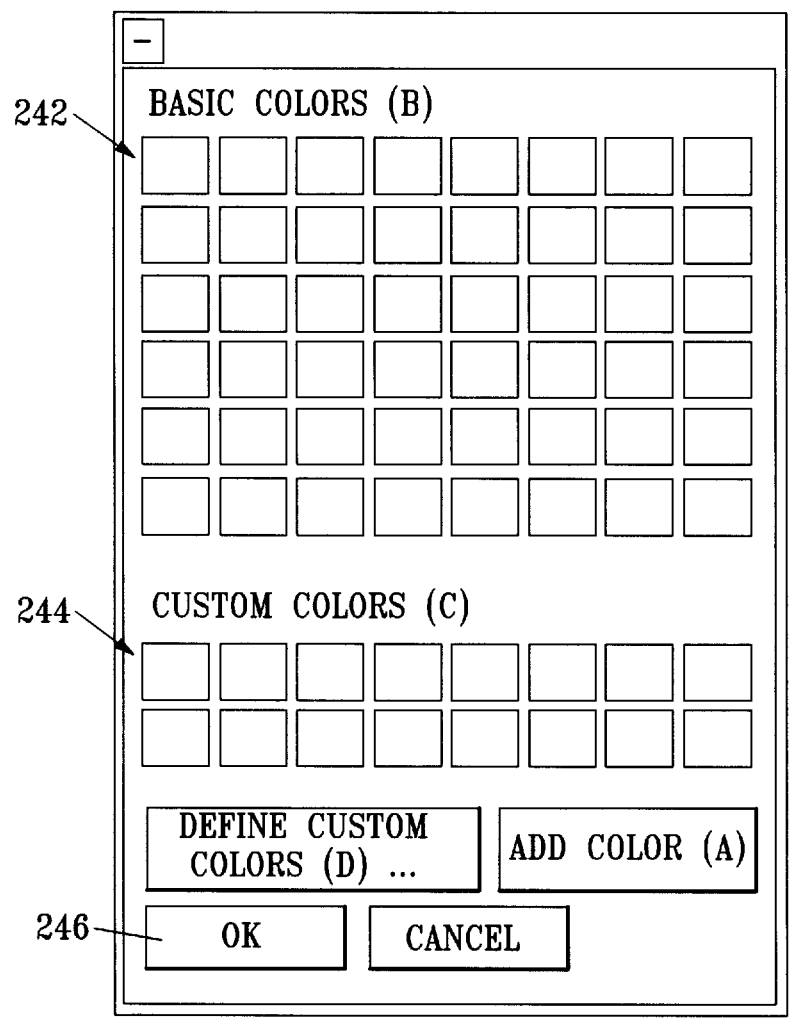
FIG. 17 is an explanatory view showing the "color setting" dialog box displayed on a display device.

Namely, first, a setting button 240 in the menu on the console is clicked to open a setting menu (not shown), and a "back color" command is selected. Then, a "color setting" dialog box is displayed on the display device 16 (see FIG. 17). A desired color is selectively clicked among those in a basic color (B) palette 242 and a produced color (C) palette 244 to set a back color, and then an OK button 246 is clicked to close the dialog box.

3-2-4. Selection of White Back Signal or Black Back Signal

The white back signal or the black back signal is selected in either the case where a video image is gradually allowed to appear from a white back (white background) or a black back (black background) (fade-in), or on the contrary, the case where a video image is gradually allowed to disappear from each of these backs (backgrounds) (fade-out), and the explanation therefor will be made by referring also to FIG. 5 in addition to FIGS. 1 through 4. When a white back/black back button 200d of the input selector for bus A 200 is clicked, the input bus selector for bus A 48 is switched to the side of a white back/black back signal terminal 48d.

To the white back/black back signal terminal 48d is inputted the white back color signal or the black back color signal produced by a white/black back color signal generating circuit 62.

A selection of either a white back is produced or a black back is produced by means of the white/black back color signal generating circuit 62 can arbitrarily be set in accordance with the following operations.

Figure 18:
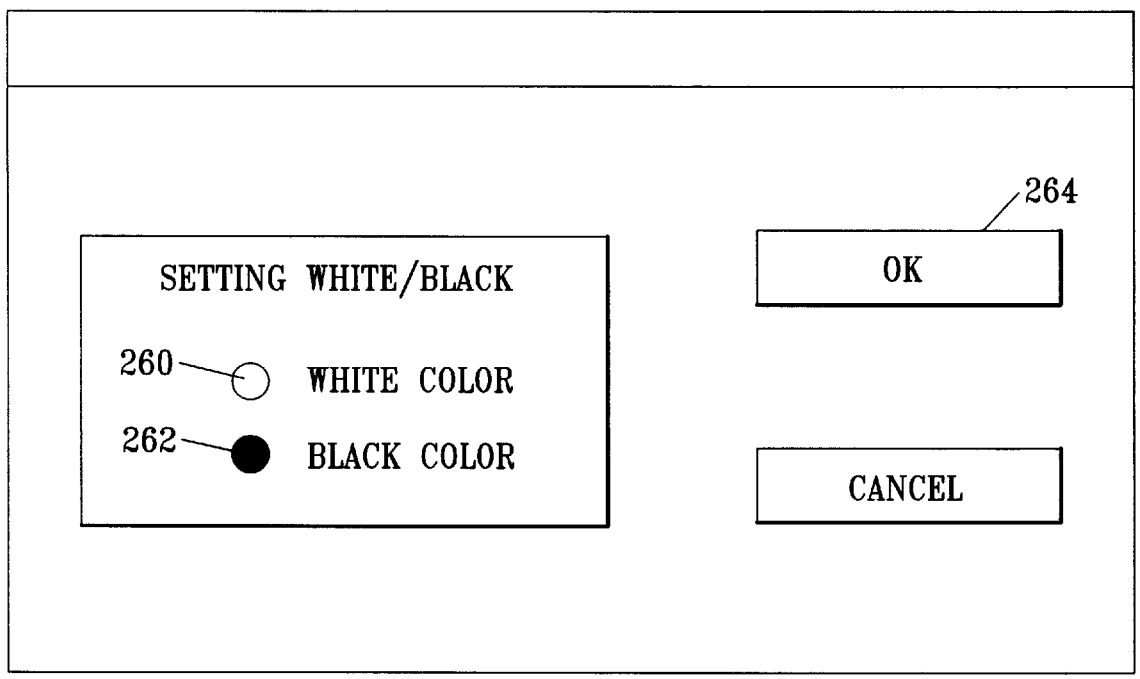
FIG. 18 is an explanatory view showing the "white/black back color setting" dialog box displayed on a display device.

Namely, first, a "setting" button 240 in the menu on the console is clicked to open a setting menu, and a "white/black back" command is selected. Then, a "white/black back color setting" dialog box is displayed on the display device (see FIG. 18). Either a white back or a black back is selected by clicking either a white button 260 or a black button 262, and then an OK button 246 is clicked to close the dialog box.

3-3. Replacement of Video Image

Then, replacement of the video image displayed on the TV monitor 26 will be described by referring principally to FIGS. 2 through 5.

The operation for replacing the video image displayed on the TV monitor 26 is carried out by using the fader 1 and the fader 2 on the console wherein when the knob 206 of the fader 1 is clicked to shift the same in the direction of the upper (the bus A) or the lower (the bus B) side, a ratio in composition of the video signal in the bus A and the video signal in the bus B in the first compositing circuit 54 is changed. Furthermore, when the knob 208 of the fader 2 is clicked to shift the same in the direction of the upper (the bus A+the bus B) or the lower (the bus C) side, a ratio in composition of the video signal obtained by compositing the video signal in the bus A with the video signal in the bus B and the video signal in the bus C in the second compositing circuit 56 is changed.

More specifically, in the case where the knob 206 of the fader 1 is in the uppermost position (bus A side), only the video signal in the bus A is outputted from the first compositing circuit 54, while a ratio of outputting the video signal in the bus B outputted from the first compositing circuit 54 increases with the shifting of the knob 206 of the fader 1 directing to the lower position, and finally when the knob 206 of the fader 1 reached the lowermost position (the bus B side), only the video signal in the bus B is outputted from the first compositing circuit 54.

As is the same as that described above, in the case where the knob 208 of the fader 2 is in the uppermost position (the bus A+the bus B sides), only the video signal outputted from the first compositing circuit 54 is outputted from the second compositing circuit 56, while a ratio of outputting the video signal in the bus C outputted from the second compositing circuit 56 increases with the shifting of the knob 208 of the fader 2 directing to the lower position, and finally when the knob 208 of the fader 2 reached the lowermost position (the bus C side), only the video signal in the bus C is outputted from the second compositing circuit 56.

As a manner for replacing video images, there are manners of so-called wiping and mixing wherein a selection between wiping and mixing manners is performed by clicking a first mixing button 266 or a first wiping button 268 with respect to the fader 1, while the selection is performed by clicking a second mixing button 270 or a second wiping button 272 with respect to the fader 2.

The term "mixing" used herein means a function for replacing two video images on the screen of the TV monitor 26 while overlapping these images, and on the other hand, the term "wiping" means a function for replacing two video images on the screen of the TV monitor 26 while switching these images.

Furthermore, when a first auto-fade button 274 is clicked, an automatically fading function for shifting automatically the knob 206 of the fader 1 at a prescribed constant speed can be selected, while when a second auto-fade button 276 is clicked, an automatically fading function for shifting automatically the knob 208 of the fader 2 at a prescribed constant speed can be selected.

It is to be noted that in case of replacing video images in two lines of buses, either the fader 1 or the fader 2 is merely used. Accordingly, in this case, it is necessary for previously setting either the fader 1 or the fader 2 so as not to contain the video image in the bus being in not use. More specifically, in case of employing only the fader 1, the knob 208 of the fader 2 is positioned at the uppermost position (the bus A+the bus B sides), while in case of employing only the fader 2, the knob 206 of the fader 1 is positioned at either the uppermost position (the bus A side: in case of using the video signal in the bus A) or the lowermost position (the bus B side: in case of using the video signal in the bus B).

For instance, in case of replacing the video image derived from the video signal in the bus A by the video image derived from the video signal in the bus B, first, the input selector for bus A 200 is operated to select the video signal to be supplied to the bus A, and then, the input selector for bus B 202 is operated to select the video signal to be supplied to the bus B.

Thereafter, the fader 1 is positioned at the uppermost position (the bus A side), while the fader 2 has been positioned at the uppermost position (the bus A+the bus B sides) since the fader 2 is not employed.

Moreover, it is decided that replacement of video images is performed in accordance with either a mixing manner or a wiping manner, and then, selection of either the mixing manner or the wiping manner is carried out by clicking either the first mixing button 266 or the first wiping button 268 of the first fader 1 dependent upon the aforesaid decision.

After the setting as described above has been made, when the knob 206 of the fader 1 is clicked to shift the same towards the lower position, the video image displayed on the TV monitor 26 changes from the video image in the bus A to that of the bus B.

In the following, the above described replacement (changes in displayed video images) will be more fully described in separate explanations for the mixing manner and the wiping manner.

3-3-1. Mixing Manner Processing

When the first mixing button 266 of the fader 1 is clicked, an internal switch SW7 is switched to the side b to control a ratio in composition of the respective video signals in the bus A and the bus B. The control in this case is realized by detecting a position of the knob 206 of the fader 1.

Furthermore, when the second mixing button 270 of the fader 2 is clicked, an internal switch SW8 is switched to the side b, whereby a ratio in compositing the video signal outputted from the first compositing circuit 54 with the video signal in the bus c by means of the personal computer 10 is controlled. The control in this case is realized by detecting a position of the knob 208 of the fader 2.

In these circumstances, when it is arranged in such that the video image in either bus of two lines of buses in which mixing processing is performed with respect to the video images contained therein is made to be white back (or black back), and when this video image is gradually replaced by the video image in the other bus which is the image except for white back, black back and color backs, the video image in the other bus comes to appear in the video image which has been displayed previously on the screen, i.e. so-called fade-in processing can be attained.

On the contrary to the above described fade-in processing, when the video image in the other bus is replaced gradually by the white back (or black back) of the video image in the former bus, the video image in the other bus which has been previously displayed on the screen comes to disappear, i.e. so-called fadeout processing can be realized.

Moreover, when both of video images from which white back, black back and color backs have been excluded are employed as the video images of two lines to be used for mixing processing, so-called dissolves (replacing video images by one another) can be achieved.

3-3-2. Wipe Processing

When the first wiping button 268 of the fader 1 is clicked, the internal switch SW7 is switched to the side a, whereby a ratio in composition of the video signal in the bus A and the video signal in the bus B is controlled by a wipe pattern signal produced by a wipe pattern generating circuit 92.

Furthermore, when the second wiping button 272 of the fader 2 is clicked, the internal switch SW8 is switched to the side a, whereby a ratio in composition of the video signal outputted from the first compositing circuit 54 and the video signal in the bus c is controlled by a wipe pattern signal produced by a wipe pattern generating circuit 92.

The term "wipe pattern generating circuit 92" used herein means a circuit for generating a signal having each of thirteen kinds of wipe patterns which have previously been set, and these thirteen kinds of wipe patterns can be selected by clicking the button of a wiping selector 278.

More specifically, when any of the buttons in the wiping selector 278 is clicked, the button of the wiping selector 278 which was clicked is detected on the side of the personal computer 10, and then, the wipe pattern generating circuit 92 is instructed so as to generate the wipe pattern corresponding to the detected button.

Furthermore, the reading timing of the wipe pattern generating circuit 92 is such that in the case when the video 1 signal is inputted to the video 1 signal input terminal 30, one line of branched three lines of the video 1 signal is inputted to the internal switch SW4 (which has been switched to the side a) through the synchronously processing circuit 86 after the inputting the video 1 signal to the video 1 signal input terminal 30.

Then, the video 1 signal inputted to the internal switch SW4 (which has been switched to the side a) through the synchronously processing circuit 86 is inputted to a reading clock generating circuit 90 wherein the reading clock of a wipe pattern is generated on the basis of the video 1 signal, the reading clock of the wipe pattern generated by the reading clock generating circuit 90 is inputted to the wipe pattern generating circuit 92, and as a result, the wipe pattern is read on the basis of the reading clock of the wipe pattern generated by the reading clock generating circuit 90.

Moreover, in the case when the video 1 signal is not inputted to the video 1 signal input terminal 30, the internal switch SW4 is switched to the side b, as a consequence, a synchronous timing of the stable video signal generated by an internal synchronization generating circuit 88 is inputted to the reading clock generating circuit 90, and a wipe pattern is read on the basis of the reading clock of the wipe pattern generated herein.

It is to be noted that the wipe patterns corresponding to the respective buttons of the wipe selector 278 correspond to the designs shown on the respective buttons. In the case where it is desired to set a wiping direction being reverse to that shown on each of the buttons of the wipe selector 278, it is sufficient to click a reverse button 280, and in case of returning to the original state, the reverse button 280 may be clicked once again.

A wiping direction in case of shifting both the knob 206 of the fader 1 and the knob 208 of the fader 2 from the upper position to the lower position is reverse to the case where both the knobs 206 and 208 of the faders 1 and 2 are shifted from the lower position to the upper position. However, if wiping of video images in the same direction is intended, it is sufficient to click a one-way button 282 irrespective of shifting directions of both the knobs 206 and 208 of the faders 1 and 2, and in case of returning to the original state, the one-way button 282 may be clicked once again.

In the present mode for embodying the invention, it is arranged in such that either one of the fader 1 and the fader 2 can only be selected in case of wiping operation, besides wiping operation cannot be selected in the fader 1 in the case where the key button 284 is clicked in the fader 2 (Functions of the key button 284 will be described later).

However, unlike the present mode for embodying the invention, it may be arranged in such that wiping operation can be selected in both the fader 1 and the fader 2, and further that wiping operation can be selected in the fader 1 in even the case where the key button 284 is clicked in the fader 2.

3-3-3. Automatic Fading Processing

In the case where automatic shifting of the knob 206 of the fader 1 and the knob 208 of the fader 2 is intended at a constant speed, it is sufficient to carry out the processing of automatic fading. Such automatic fading processing can be performed in the fader 1 and the fader 2, respectively.

The operation for performing the automatic fading processing is such that first, the knob of either the fader 1 or the fader 2 in which the processing of automatic fading is intended is positioned to the lowest position (the bus B side in case of the fader 1, and the bus C side in case of the fader 2).

Then, an auto-fade button (the first auto-fade button 274 in case of the fader 1, and the second auto-fade button 276 in case of the fader 2) of either the fader 1 or the fader 2 in which automatic fading processing is intended to perform is clicked.

Each speed for shifting automatically the knob 206 of the fader 1 and the knob 208 of the fader 2 can suitably be varied by the following operations.

Figure 19:
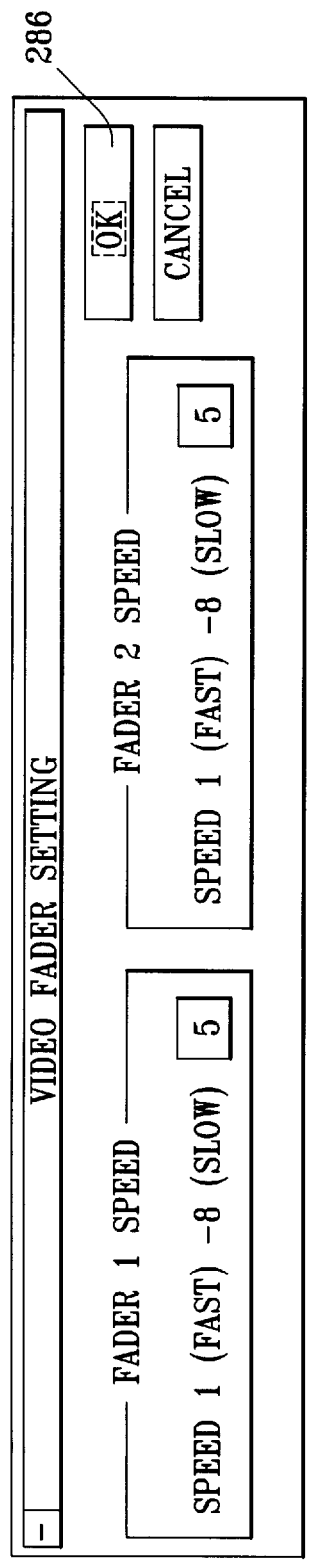
FIG. 19 is an explanatory view showing the "video fader setting" dialog box displayed on a display device.

Namely, first, when the setting button 240 in the menu on the console is clicked to open the setting menu, and a "video fader" command is selected. As a consequence, a "video fader setting" dialog box is displayed (see FIG. 19). Each of speeds for shifting the knob 206 of the fader 1 and the knob 208 of the fader 2 is specified by each of numerical values, and then the OK button 286 is clicked to close the dialog box.

According to the above described operations, the speeds for shifting automatically the knob 206 and the fader 1 and the knob 208 of the fader 2 can arbitrarily be set.

In such a case when the first auto-fade button 274 or the second auto-fade button 276 is clicked in the event where either the knob 206 of the fader 1 or the knob 208 of the fader 2 is on the midway, either of the knob 206 of the fader 1 and the knob 208 of the fader 2 shifts once to either the uppermost or the lowermost position being the one positioned nearer to either of the knobs 206 and 208, and then automatic fading processing is carried out.

Furthermore, in the present mode for embodying the invention, while a scrolling function for processing the memory effect which will be described later cannot be performed simultaneously with automatic fading processing, it may be, of course, adapted to be capable of effecting automatic fading processing together with the scrolling function.

In the present mode for embodying the invention, while the explanation has been made on automatic fading processing in either the case where the respective faders shift from the lowermost position to the uppermost position or the case where the respective faders shift from the uppermost position to the lowermost position, it may be also arranged in such that shifting of the respective faders start from a position on the midway or stop at a position on the midway.

In FIG. 4, a triangular mark 340 in the fader 1 is adapted to set a stopping position for movement of the fader 1. When the triangular mark 340 is dragged by the use of the mouse 14 to move the mark 340 to an arbitrary position, and then to stop the same, the position at which the triangular mark 340 stopped is the stopping position for movement of the fader 1.

Thereafter, the knob 206 of the fader 1 is dragged to move to a prescribed position, and then, when the first auto-fade button 274 is clicked, the knob 206 shifts automatically from the present position to the position specified by the triangular mark 340.

In accordance with the same manner as that described above, a starting position for movement as well as a stopping position for movement in case of automatic fading processing can also be set with respect to the fader 2 as well as an audio fader A1, an audio fader A2, and an audio fader AUX, respectively, In this case, if the audio faders have been set to move in synchronization with the movement of the fader 1, they are constituted in such that when the fader 1 commences the movement from the starting position for movement, the audio faders commence also simultaneously the movement from the starting position for movement with the former movement, while when the fader 1 reaches the stopping position for movement, the audio faders also reach the stopping position for movement at the same time of the reach of the fader 1.

A moving rate of the fader 1 has previously been set suitably, and a moving rate of an audio fader is calculated from a distance moved of the audio fader and a required period of time calculated from a distance moved and the moving rate of the fader 1.

In the case where the moving rates of the audio faders have been set, it may be arranged in such that the video faders and the audio faders move at their rates, respectively, and these faders move respectively before they reach the stopping positions for movement.

3-4. Composition of Video Image by Means of Key Signal

In case of compositing video image, it may be adapted to cut off only a specified part of a designated video image and to composite the same with the other video image, and in such a case, such a signal for cutting off a video image is called "key signal".

Manners for cutting off a video image by means of such key signal, three types of keys, i.e., "chromakey", "luminance key", and "alpha key" are prepared, and further two types, i.e., "analog key" and "digital key" are prepared for each of the above described three types of keys. These cutting-off manners are arranged to be selected by clicking the respective buttons in a key selector.

An analog key is used together with the mixing or wiping processing by means of the fader 2. In this case, when any of analog keys is clicked in the key selector, the composition of the video signals outputted from the first compositing circuit 54 and the video signal from the bus C can be made in accordance with the cutting-off manner due to the clicked analog key.

Furthermore, a degree of composition in case of selecting a digital key is adapted to adjust the degree at a position of the knob 208 of the fader 2. When a reverse button 300 of the key selector is clicked, the video image under the composition is reversed.

It is to be noted that the respective buttons of a digital key are interlocked with the respective buttons of the fader 2, so that when any button of the digital key is selected, a key button 284 of the fader 2 is automatically specified.

On one hand, in the case when wipe processing by means of the fader 1 is selected, it is arranged in such that the key button 284 cannot be selected by the fader 2.

3-4-1. Composition of Video Image in Use of Alpha Key

An alpha key is a means for functioning to distribute a compositing ratio onto a video image derived from video signals outputted from the first compositing circuit 54 and a video image of the bus C dependent upon luminance or transmittance of a video image derived from the video signals read into the alpha memory 70.

As described above, since the alpha key decides a compositing ratio based on a different video image from that derived from the video signals which have been inputted to the respective buses, there is no fear of varying the compositing ratio dependent upon the video image to be composited.

In the case where a digital alpha key is used, replacement of video images can be carried out by employing a wipe pattern which has been prepared originally by a user and stored as an image file. Besides, when an analog alpha key is used, a title is introduced into a video image by this compositing manner.

3-4-1-1. Reading Data into Alpha Memory

In the following, operations for compositing the video 1 signal and the frame memory signal by employing a digital alpha key as well as an analog alpha key will be described wherein first, operations for selecting image signals to be written into the alpha memory 70 will be mentioned.

As described above, there are transmittance data indicating transmittance of a title, luminance data indicating luminance of a video image, gray-scaled data of an image file and the like as those which can read into the alpha memory 70.

For reading data into the alpha memory 70, the alpha memory specifying button 212 is clicked to open a list for selection of a file to be read into the alpha memory 70, then, any of title file, image file, and alpha file is selected as a file which is intended to be read, and the selected file on the console is clicked. As a result, a dialog box of the file clicked is opened, and the desired file is selected therefrom by clicking the objective file.

Then, when an OK button is clicked, the selected file is read into the alpha memory 70, the dialog box is automatically closed, and the video image of the file selected is displayed in an alpha memory monitor 302 on the console.

When a title file is selected as a file to be read, the undermentioned analog alpha key is automatically selected in a key selector.

Into the alpha memory 70 may also be read a color image file, and in that case, the color image file is converted to a gray-scaled (8 bits per 1 pixel) image file as described above, and then the file converted is read into the alpha memory 70.

3-4-1-2. Composition of Video Image by Digital Alpha Key

Explanation will be made by referring to FIGS. 2 and 3. A digital alpha key may be selected by clicking a D α button 296 wherein the internal switch SW9 is switched to the side c, the internal switch SW10 is switched to the side b, and the internal switch SW11 is switched to the side a, respectively.

In the digital alpha key, a part composed of a brighter signal component than luminance which is to be a threshold level becomes a video image of the bus C line as well as a part composed of a darker signal component than that of the threshold level comes to be a video image derived from the image signals outputted from the first compositing circuit 54 on the basis of the luminance of the video signals outputted from the alpha memory 70. For this reason, the video image of the bus C line is clearly separated from the video image derived from the video signals outputted from the first compositing circuit 54 by the part of signal component being to be the threshold level as its border.

In the above case, the luminance to be the threshold level is adjusted by shifting the knob 208 of the fader 2, and on the other hand, when a video image appeared on the part brighter than that corresponding to a threshold level is reversed with a video image appeared on the part darker than that corresponding to the threshold value, it is sufficient to click a reverse button 300.

Operations for the case of compositing the video 1 signal and a frame memory signal by the use of a digital alpha key will be described hereinbelow.

First, the video 1 signal and the frame memory signal are selected for a video image in the bus A and a video image in the bus C, respectively.

In this case, the fader 2 is shifted to the lowermost position (side C), while the knob 206 of the fader 1 is shifted to the uppermost position (side A), because the bus B is not used.

Then, an image file signal is selected as the frame memory signal, a desired image file is written into the frame memory 58, and the image file which has been written into the frame memory 58 is read and outputted.

Moreover, an alpha file indicating luminance is read into the alpha memory 70.

For selecting a digital alpha key, the D α button 296 in the key selector is clicked. In this case, when the digital alpha key is selected by clicking the D α button 296, the key button 284 of the fader 2 is also automatically selected.

Thereafter, when the knob 208 of the fader 2 is continued to shift, luminance which is to be the threshold level varies, so that the video 1 signal in the bus A comes to be switched by the frame memory signal of the bus C in a wiping manner in accordance with the brightness of the image due to the alpha file read into the alpha memory 70.

In addition, such wipe may be conducted in accordance with an original wipe pattern prepared by a user with the use of a digital alpha key.

In the above case, the original wipe pattern is prepared by means of a well-known graphic data processor as an alpha file composed of gray-scaled or black and white images, and the resulting file may be stored in a file memory.

For example, in case of replacing an image by another image from the left of a screen in accordance with wiping manner, such graphics having black and white gradation wherein there is the white left end in the screen and the color thereof becomes gradually blackish with the movement towards the right side have been previously prepared. The resulting graphics are read into the alpha memory 70, besides the graphics are adopted as the images for the respective lines of the buses A and B, and then an image to be replaced is selected according to wiping manner. Under the circumstances, when the knob 208 of the fader 2 is shifted, the image is replaced from the left side of the screen by means of wipe.

Thus, replacement of images can be effected with the use of the user's original wipe pattern by such a manner that graphics having gradation which is allowed to match with variations of the wipe had been prepared by the user, and the resulting graphics have been read into the alpha memory.

3-4-1-3. Composition of Image by Analog Alpha Key

Explanation will be made by referring to FIGS. 2 and 3. An analog alpha key may be selected by clicking an A α button 298 wherein the internal switch SW9 is changed over to the side c, the internal switch SW10 is switched to the side a, and the internal switch SW11 is changed over to the side a, respectively.

In the analog alpha key, based on luminance of the image signal outputted from the alpha memory 70, the brighter luminance than that which comes to be a threshold level brings about the more intensified image of the line of the bus C, while the darker luminance than the threshold level produces the more intensified image signal which is outputted from the first compositing circuit 54. For this reason, the images of the line of the bus C become mixed with the images derived from the image signals outputted from the first compositing circuit 54 dependent upon the brightness.

In the above case, the luminance to be the threshold level is adjusted by shifting the knob 208 of the fader 2, and on one hand, when a video image appeared on the part brighter than that corresponding to a threshold level is reversed with a video image appeared on the part darker than that corresponding to the threshold value, it is sufficient to click a reverse button 300.

Operations for the case of compositing the video 1 signal and a frame memory signal by the use of an analog alpha key will be described hereinbelow.

As same as the case of the digital alpha key, first, the video 1 signal and the frame memory signal are selected for a video image in the bus A and a video image in the bus C, respectively, and then, the fader 2 is shifted to the lowermost position (side C), while the fader 1 is shifted to the uppermost position (side A).

Then, an image file signal is selected as the frame memory signal, a desired image file is written into the frame memory 58, and the image file which has been written into the frame memory 58 is read and outputted.

Moreover, an alpha file indicating luminance is read into the alpha memory 70.

For selecting an analog alpha key, the A α button 298 in the key selector is clicked.

As a consequence, the video 1 signal in the bus A and the frame memory signal in the bus C are composited in accordance with the brightness of a picture image derived from the image file which has been written into the alpha memory 70.

It is to be noted that when a title signal is selected as a frame memory signal, the title can be superposed on the video 1 signal.

As described above, a title file is composed of a pair of title data indicating characters themselves and transmittance data having the same profiles as those of the characters, but indicating only the transmittance thereof. Because of this fact, in the case where the frame memory 58 is specified and a title file is written thereinto, the title data are written into the frame memory 58, while the transmittance data being the pair of the title data are also written into the alpha memory 70, so that an analog alpha key is automatically selected in the key selector. This is because for displaying the title clearly without affecting adversely from the base image on which is to be superposed the title.

On the contrary to the above, when the alpha memory 70 is specified and a title file is written thereinto, the transmittance data are written into the alpha memory 70, but the title data being the pair of the transmittance data are not written into the frame memory 58. Accordingly, into the frame memory 58 can be read another image file, so that another image can be composited with the profiles of characters.

In the case where only the transmittance data have been written into the alpha memory 70 as described above, for example, title signals are composited in accordance with the manner as mentioned hereinbelow.

First, a back color signal or a white back/black back signal is selected as a video image in the bus C, and the knob 208 of the fader 2 is shifted to the lowermost position (side of the bus C). On the other hand, the video 1 signal and the frame memory signal are selected as video images in the buses A and B, respectively.

In this situation, the video signals in the buses A and B are composited in the first compositing circuit 54, and with respect to the video image of the video signals thus composited, the back color signal or the white back/black back signal is composited with the profiles of characters. In other words, the monochrome characters are composited with respect to the video image outputted from the first compositing circuit 54 in response to the transmittance data.

As is clear from the above description, since no frame memory is used with respect to the composition of characters, it becomes possible to use a free frame memory for other applications, e.g., it may be used for the composition of the respective video images in the buses A and B as a frame synchronizer as described above.

3-5. Explanation for Addition of Special Effects to Video Image

In the video editor according to the present invention, special effects can be added to a video image derived from the data which have been read into the frame memory 58.

Such special effects, there are six types of them, i.e., "still", "strobe", "scrolling", "solarization 1", "solarization 2", and "solarization 3". For adding the special effects, a button corresponding to each of the special effects which is intended to be added may be clicked. These special effects can be applied in combinations shown in the table of FIG. 20.

Each of the above described six types of special effects will be described hereinbelow.

3-5-1. Still

In course of inputting motion video image, when a still button 304 is clicked, the motion video image is turned to a still-frame image. In case of returning from a still-frame image to the motion video image, the still button 304 may be clicked once again.

3-5-2. Strobe

When a strobe button 306 is clicked, strobe effect (a moving video picture is turned to still-frame images with a certain interval) can be attained. In case of returning to a state of normal moving video picture, the strobe button 306 may be clicked once more.

A tempo of the strobe effect can be suitably changed by the following manner. Namely, first, when the setting button 240 of the menu on the console is clicked to open the setting menu, and a "strobe interval" command is selected, so that "Setting for strobe interval" dialog box is displayed (not shown). Then, the strobe interval is specified with a numerical value, and an OK button 308 is clicked to close the dialog box.

In accordance with the above described operations, the strobe interval can arbitrarily be set.

3-5-3. Scrolling

When a scroll button 310 is clicked, a frame memory video image shifts once from the specified direction. Accordingly, it is required to preliminarily select the frame memory video image as the signal for the bus C.

In this case, a moving direction and a speed in scrolling may suitably be changed in accordance with the following operations.

Figure 21:
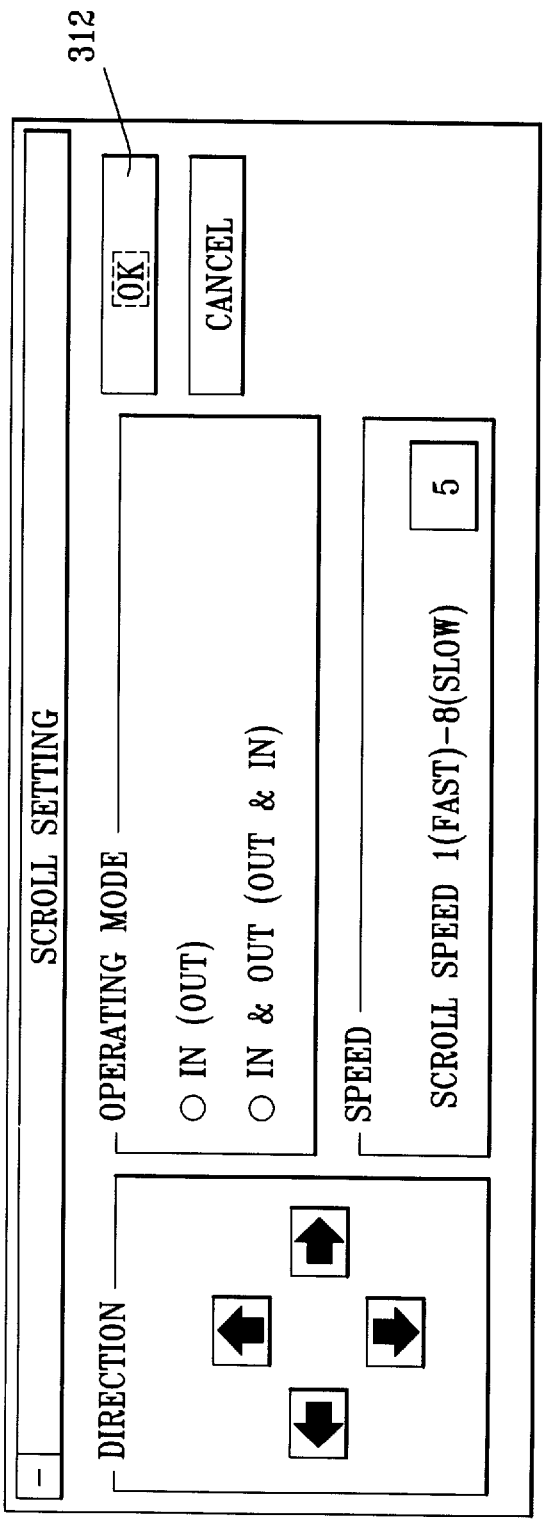
FIG. 21 is an explanatory view showing "scroll setting" dialog box displayed on a display device.

Namely, when the setting button 240 in the menu of the console is clicked to open the setting menu, and then a "scrolling" command is selected. As a result, a "scroll setting" dialog box is displayed (see FIG. 21). Thereafter, the items displayed in the "scroll setting" dialog box are suitably set.

As the items, there are the one "direction" for selecting the moving direction, the one "operating mode" for selecting a manner of movement, and the one "speed" for adjusting a speed of scrolling.

In this situation, when an "in (out)" command in the operating mode is selected, a picture image shifts from the specified direction, and then stops in the central portion of the screen, i.e., the operating mode is in the "in" mode in the case when the knob 208 of the fader 2 is positioned at the uppermost (the side AB), while the picture image disappears from the central portion on the screen towards the specified direction, i.e., the operating mode is in the "out" mode in the case when the knob 208 of the fader 2 is in the lowermost position (the side C).

Moreover, when an "in & out (out & in)" command in the operating mode is selected, a picture image shifts from the specified direction and then, disappears from the screen, i.e., the operating mode is in the "in & out" mode in the case when the knob 208 of the fader 2 is in the uppermost position (the side AB), while a picture image disappears once in the specified direction, and then appears again to stop in the central portion of the screen, i.e., the operating mode is in the "out & in" mode in the case where the knob 208 of the fader 2 is in the lowermost position (the side C).

In addition, the "speed" is a command for adjusting the speed in scrolling as described above, and the setting range is "1–8" in the case where the "in (out)" command has been selected in the operating mode, while the setting range is "1–4" in the case where the "in & out (out & in) command has been selected in the operating mode.

To finish the setting of scrolling, an OK button 314 is clicked to close the dialog box.

3-5-4. Solarization 1, Solarization 2, and Solarization 3

When a solarization 1 button 314, a solarization 2 button 316 or a solarization 3 button 318 is clicked, solarization in three different grades (the brightness in a picture image becomes roughened so that pictorial color tone is obtained) is achieved. When intended to return the original state, the button selected is clicked once again.

Since the present invention has been constituted as described above, there is such an excellent advantage in that user's flexibility in edits of video signals is remarkably improved in a video editor which is suitably used for DTV and the like.

What is claimed is:

1. A memory control device for video editors comprising:

a storage means for storing at least one or more of title data composed of video image data representing title signals and key data used for controlling the title signal;

a first memory for storing video image data and which is provided with a data reading means for reading the video image data so as to be capable of displaying said data in the form of a video image;

a second memory for storing key data and which is provided with a video image controlling means for controlling a video image to be displayed on the basis of the key data read;

a specifying means for specifying a memory into which is to be written the title data which have been stored in said storage means; and a writing means which reads the video image data and the key data of title data from said storage means to write both the data thus read into said first memory and said second memory, respectively, in the case when said first memory is specified by said specifying means, while which reads only the key data of the title data from said storage means to write the data thus read into said second memory in the case when said second memory is specified by said specifying means.

2. A memory control device for video editors comprising:

a memory for storing key data used for controlling video images to be displayed and which is provided with a video image controlling means for controlling the video images on the basis of the key data read;

a storage means for storing at least one or more of either of video image data or key data;

an extracting means for extracting selectively data from said storage means; and a writing means for writing the key data extracted selectively by said extracting means into said memory with no conversion of the key data thus extracted in the case where the data extracted selectively by said extracting means are the key data, while writing the video image data extracted selectively by said extracting means into said memory with conversion of the video image data thus extracted selectively by said extracting means in the case where the data extracted selectively by said extracting means are the video image data.

3. A memory control device for video editors comprising:

a memory for storing video image data and which is provided with a data reading means for reading the video image data so as to be capable of displaying said data in the form of a video image;

a storage means for storing at least one or more of either of the video image data or key data used for controlling a video image to be displayed; and a writing means for writing the video image data extracted selectively by said extracting means into said memory with no conversion of the video image data thus extracted in the case where the data extracted selectively by said extracting means are the video image data, while writing the key data extracted selectively by said extracting means into said memory with conversion of the key data thus extracted selectively by said extracting means in the case where the data extracted selectively by said extracting means are the key data.

* * * * *

UNITED STATES PATENT AND TRADEMARK OFFICE
CERTIFICATE OF CORRECTION

PATENT NO. : 5,877,781
DATED : March 2, 1999
INVENTOR(S) : TOMIZAWA et al.

It is certified that error appears in the above-identified patent and that said Letters Patent is hereby corrected as shown below:

On the title page of the patent at "[22] Filed:" delete "Jan. 29, 1996" and insert therefor -- November 29, 1995 --.

Signed and Sealed this

Thirteenth Day of June, 2000

Attest:

Q. TODD DICKINSON

*Attesting Officer*    *Director of Patents and Trademarks*